(12) United States Patent
Shanmugam et al.

(10) Patent No.: US 11,913,690 B2
(45) Date of Patent: Feb. 27, 2024

(54) REFRIGERATION SYSTEM WITH EFFICIENT EXPANSION DEVICE CONTROL, LIQUID REFRIGERANT RETURN, OIL RETURN, AND EVAPORATOR DEFROST

(71) Applicant: Hill Phoenix, Inc., Conyers, GA (US)

(72) Inventors: Senthilkumar Kandappa Goundar Shanmugam, Covington, GA (US); Manu Mital, Covington, GA (US)

(73) Assignee: Hill Phoenix, Inc., Conyers, GA (US)

(*) Notice: Subject to any disclaimer, the term of this patent is extended or adjusted under 35 U.S.C. 154(b) by 0 days.

(21) Appl. No.: 17/991,196

(22) Filed: Nov. 21, 2022

(65) Prior Publication Data

US 2023/0112193 A1    Apr. 13, 2023

Related U.S. Application Data

(62) Division of application No. 16/871,153, filed on May 11, 2020, now Pat. No. 11,536,498.

(51) Int. Cl.
| | |
|---|---|
| *F25B 49/02* | (2006.01) |
| *F25B 41/31* | (2021.01) |
| *F25B 47/02* | (2006.01) |
| *F25B 39/02* | (2006.01) |
| *F25B 43/02* | (2006.01) |

(52) U.S. Cl.
CPC ............ *F25B 41/31* (2021.01); *F25B 39/028* (2013.01); *F25B 43/02* (2013.01); *F25B 47/02* (2013.01); *F25B 49/02* (2013.01); *F25B 2400/23* (2013.01); *F25B 2600/05* (2013.01); *F25B 2600/2513* (2013.01); *F25B 2700/03* (2013.01); *F25B 2700/04* (2013.01)

(58) Field of Classification Search
CPC ...... F25B 41/31; F25B 49/02; F25B 2600/05; F25B 2600/2513; F25B 2700/03; F25B 2700/04

See application file for complete search history.

(56) References Cited

U.S. PATENT DOCUMENTS

| | | | |
|---|---|---|---|
| 3,645,109 A | * | 2/1972 | Quick .................. F25B 47/022 62/196.2 |
| 8,646,286 B2 | | 2/2014 | Scherer et al. |
| 10,119,729 B2 | * | 11/2018 | Derosier .................. F25B 5/04 |
| 11,536,498 B2 | | 12/2022 | Shanmugam et al. |
| 2010/0132395 A1 | | 6/2010 | Barbieri et al. |
| 2013/0086930 A1 | | 4/2013 | Scherer et al. |
| 2018/0010830 A1 | | 1/2018 | Scherer |
| 2018/0163998 A1 | | 6/2018 | Liebendorfer et al. |
| 2019/0360725 A1 | * | 11/2019 | Kondou .................. F25B 49/02 |
| 2021/0348811 A1 | | 11/2021 | Shanmugam et al. |

* cited by examiner

*Primary Examiner* — Jonathan Bradford
(74) *Attorney, Agent, or Firm* — Fish & Richardson P.C.

(57) ABSTRACT

A refrigeration system includes an evaporator configured to receive a flow of refrigerant and transfer heat into the refrigerant within the evaporator to provide cooling for a temperature-controlled space, an expansion valve operable to modulate the flow of refrigerant into the evaporator, a liquid level sensor configured to measure a level of liquid accumulated within a component of the refrigeration system, and a controller configured to operate the expansion valve to increase the flow of refrigerant into the evaporator or decrease the flow of refrigerant into the evaporator based on the level of liquid measured by the liquid level sensor.

20 Claims, 17 Drawing Sheets

REFRIGERATION SYSTEM WITH EFFICIENT EXPANSION DEVICE CONTROL, LIQUID REFRIGERANT RETURN, OIL RETURN, AND EVAPORATOR DEFROST

CROSS REFERENCE TO RELATED APPLICATIONS

This application is a divisional application of and claims priority under 35 U.S.C. § 121 to U.S. application Ser. No. 16/871,153, filed on May 11, 2020, the entire contents of which is incorporated herein by reference.

BACKGROUND

The present disclosure relates generally to refrigeration systems and more particularly to systems and methods for controlling refrigerant flow, oil flow, and defrosting operations in refrigeration systems.

It is desirable in refrigeration systems to ensure that any refrigerant entering a compressor of the refrigeration system is in a gas or vapor state because feeding liquid refrigerant into the compressor can damage the compressor. Conventional refrigeration systems use temperature sensors and pressure sensors at the outlet of the evaporator to calculate the degree of superheat of the refrigerant to ensure that the refrigerant has fully evaporated and no liquid remains. An expansion device of the refrigeration system can then be operated to reach a target level of superheat. However, high amounts of superheat indicate that the refrigerant is being heated more than necessary to avoid damage to the compressor, which can lower the efficiency of the refrigeration system.

Some refrigeration systems include vapor quality sensors or void fraction sensors to determine the thermodynamic vapor quality of the refrigerant and operate the expansion valve based on the vapor quality. However, vapor quality sensors are typically incapable of measuring degrees of superheat and will provide misleading measurements when the refrigerant has any amount of superheat. Additionally, it can be difficult to use the feedback from vapor quality sensors to operate the expansion valve when the refrigeration system includes a long run of pipes through the evaporator because the feedback from the vapor quality sensor may not reflect instantaneous conditions at the location of the expansion device. It would be desirable to provide a refrigeration system capable of controlling the expansion device to prevent compressor damage while ensuring efficient operation of the refrigeration system and overcoming the challenges associated with vapor quality sensors.

SUMMARY

One implementation of the present disclosure is a refrigeration system including an evaporator configured to receive a flow of refrigerant and transfer heat into the refrigerant within the evaporator to provide cooling for a temperature-controlled space, an expansion valve operable to modulate the flow of refrigerant into the evaporator, a liquid level sensor configured to measure a level of liquid accumulated within a component of the refrigeration system, and a controller configured to operate the expansion valve to increase the flow of refrigerant into the evaporator or decrease the flow of refrigerant into the evaporator based on the level of liquid measured by the liquid level sensor.

In some embodiments, the refrigeration system includes an oil level sensor configured to measure a level of oil accumulated within the component of the refrigeration system. The level of liquid may be a total level of oil and liquid refrigerant accumulated within the component of the refrigeration system. The controller may be configured to determine a level of liquid refrigerant accumulated within the component of the refrigeration system by subtracting the level of oil from the total level of oil and liquid refrigerant and operate the expansion valve to increase the flow of refrigerant into the evaporator or decrease the flow of refrigerant into the evaporator based on the level of liquid refrigerant.

In some embodiments, the refrigeration system includes a liquid collection header coupled to the evaporator. The liquid collection header may be the component of the refrigeration system within which the liquid is accumulated and the level of liquid is measured.

In some embodiments, the refrigeration system includes a liquid/vapor separator fluidly coupled to a refrigerant outlet of the evaporator and configured to receive a flow of the refrigerant exiting the evaporator. The liquid/vapor separator may be the component of the refrigeration system within which the liquid is accumulated and the level of liquid is measured.

In some embodiments, the controller is configured to compare the level of liquid accumulated within the component of the refrigeration system to a threshold value, modulate the expansion valve toward a fully open position to increase the flow of refrigerant into the evaporator in response to the level of liquid accumulated within the component of the refrigeration system being less than the threshold value, and modulate the expansion valve toward a fully closed position to decrease the flow of refrigerant into the evaporator in response to the level of liquid accumulated within the component of the refrigeration system being greater than the threshold value.

In some embodiments, the refrigeration system includes one or more sensors configured to measure at least one of a temperature or a pressure of the refrigerant at a location within the refrigeration system. The controller may be configured to determine an amount of superheat of the refrigerant at the location within the refrigeration system using one or more measurements from the one or more sensors and operate the expansion valve to increase the flow of refrigerant into the evaporator or decrease the flow of refrigerant into the evaporator based on both the level of liquid measured by the liquid level sensor and the amount of superheat of the refrigerant at the location within the refrigeration system.

In some embodiments, the controller is configured to compare the amount of superheat to a threshold value, modulate the expansion valve toward a fully open position to increase the flow of refrigerant into the evaporator in response to the amount of superheat being greater than the threshold value, and modulate the expansion valve toward a fully closed position to decrease the flow of refrigerant into the evaporator in response to the amount of superheat being less than the threshold value.

Another implementation of the present disclosure is a refrigeration system including a compressor configured to circulate a refrigerant within the refrigeration system, an evaporator configured to transfer heat into the refrigerant within the evaporator to provide cooling for a temperature-controlled space, and a liquid/vapor separator configured to separate the refrigerant into vapor refrigerant and liquid refrigerant. The liquid/vapor separator includes an inlet fluidly coupled to an outlet of the evaporator and configured to receive the refrigerant from the evaporator, a vapor refrigerant outlet fluidly coupled to the compressor and configured to discharge the vapor refrigerant to the compressor, and a liquid refrigerant outlet fluidly coupled to the evaporator and configured to return the liquid refrigerant to the evaporator.

In some embodiments, the compressor is configured to compress the refrigerant to create a high pressure source within the refrigeration system. The refrigeration system may further include a pressurization line fluidly coupling the high pressure source to the liquid/vapor separator and a pressure regulating valve located along the pressurization line and operable to fluidly connect the liquid/vapor separator to the high pressure source and disconnect the liquid/vapor separator from the high pressure source.

In some embodiments, connecting the liquid/vapor separator to the high pressure source causes the liquid refrigerant within the liquid/vapor separator to exit the liquid/vapor separator via the liquid refrigerant outlet and return to the evaporator.

In some embodiments, the refrigeration system includes one or more transfer valves fluidly coupled to the vapor refrigerant outlet of the liquid/vapor separator and adjustable between an open position in which the vapor refrigerant is permitted to exit the liquid/vapor separator via the vapor refrigerant outlet and a closed position in which the vapor refrigerant is prevented from exiting the liquid/vapor separator through the vapor refrigerant outlet.

In some embodiments, the refrigeration system includes a controller configured to perform a liquid refrigerant return process including closing the one or more transfer valves to prevent the vapor refrigerant from exiting the liquid/vapor separator through the vapor refrigerant outlet, connecting the liquid/vapor separator to a high pressure source to pressurize the vapor refrigerant and liquid refrigerant within the liquid/vapor separator, and opening a liquid refrigerant return valve fluidly coupled to the liquid refrigerant outlet of the liquid/vapor separator, causing the liquid refrigerant within the liquid/vapor separator to exit the liquid/vapor separator via the liquid refrigerant outlet and return to the evaporator.

In some embodiments, the refrigerant received from the evaporator includes oil; the liquid/vapor separator is configured to separate the refrigerant into the vapor refrigerant, the liquid refrigerant, and the oil; and the liquid/vapor separator comprises an oil outlet fluidly coupled to the compressor and configured to return the oil to the compressor.

In some embodiments, the refrigeration system includes an oil return valve fluidly coupled to the oil outlet of the liquid/vapor separator and adjustable between an open position in which the oil is permitted to exit the liquid/vapor separator via the oil outlet and a closed position in which the oil is prevented from exiting the liquid/vapor separator through the oil outlet.

In some embodiments, the refrigeration system includes a controller configured to perform an oil return process including closing one or more transfer valves to prevent the vapor refrigerant from exiting the liquid/vapor separator through the vapor refrigerant outlet; connecting the liquid/vapor separator to a high pressure source to pressurize the vapor refrigerant, the liquid refrigerant, and the oil within the liquid/vapor separator; and opening the oil return valve, causing the oil within the liquid/vapor separator to exit the liquid/vapor separator via the oil outlet and return to the compressor.

In some embodiments, the refrigeration system includes a liquid level sensor configured to measure a level of liquid accumulated within the liquid/vapor separator and a controller configured to initiate a liquid refrigerant return process in response to at least one of the level of liquid accumulated within the liquid/vapor separator exceeding a threshold value or a calculated value based on the level of liquid accumulated within the liquid/vapor separator exceeding a threshold value.

In some embodiments, the refrigeration system includes an oil level sensor configured to measure a level of oil accumulated within the liquid/vapor separator. The level of liquid may be a total level of oil and liquid refrigerant accumulated within the liquid/vapor separator. The controller may be configured to determine a level of liquid refrigerant accumulated within the liquid/vapor separator by subtracting the level of oil from the total level of oil and liquid refrigerant and initiate a liquid refrigerant return process in response to the level of liquid refrigerant accumulated within the liquid/vapor separator exceeding the threshold value.

Another implementation of the present disclosure is a method for returning liquid refrigerant from a liquid/vapor separator to an evaporator of a refrigeration system. The method includes closing one or more transfer valves to prevent vapor refrigerant within the liquid/vapor separator from exiting the liquid/vapor separator through a vapor refrigerant outlet of the liquid/vapor separator, connecting the liquid/vapor separator to a high pressure source to pressurize the vapor refrigerant and the liquid refrigerant within the liquid/vapor separator, and opening a liquid refrigerant return valve fluidly coupled to a liquid refrigerant outlet of the liquid/vapor separator, causing the liquid refrigerant within the liquid/vapor separator to exit the liquid/vapor separator via the liquid refrigerant outlet and return to the evaporator.

In some embodiments, the method includes opening an oil return valve fluidly coupled to an oil outlet of the liquid/vapor separator, causing oil within the liquid/vapor separator to exit the liquid/vapor separator via the oil outlet and return to a compressor of the refrigeration system.

In some embodiments, the method includes determining a level of the liquid refrigerant accumulated within the liquid/vapor separator. In some embodiments, closing the one or more transfer valves, connecting the liquid/vapor separator to the high pressure source, and opening the liquid refrigerant return valve in response to a determination that the level of liquid refrigerant accumulated within the liquid/vapor separator violates a threshold condition.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Low Pressure Liquid Refrigerant and Oil Return System

Figure 1A:
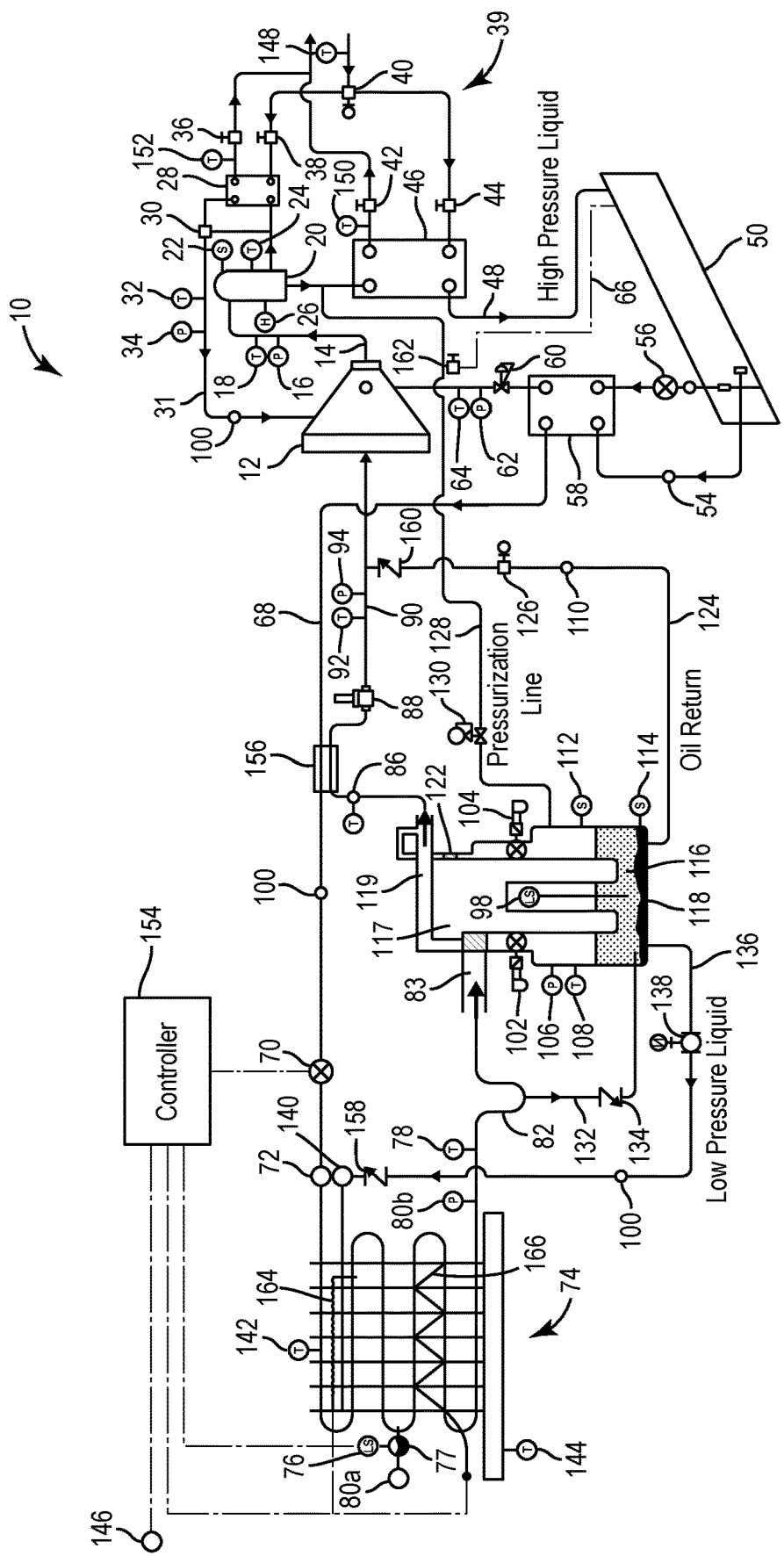
FIG. 1A is a block diagram of a refrigeration system including a liquid refrigerant trap and a liquid/vapor separator, according to some embodiments.
Figure 1B:
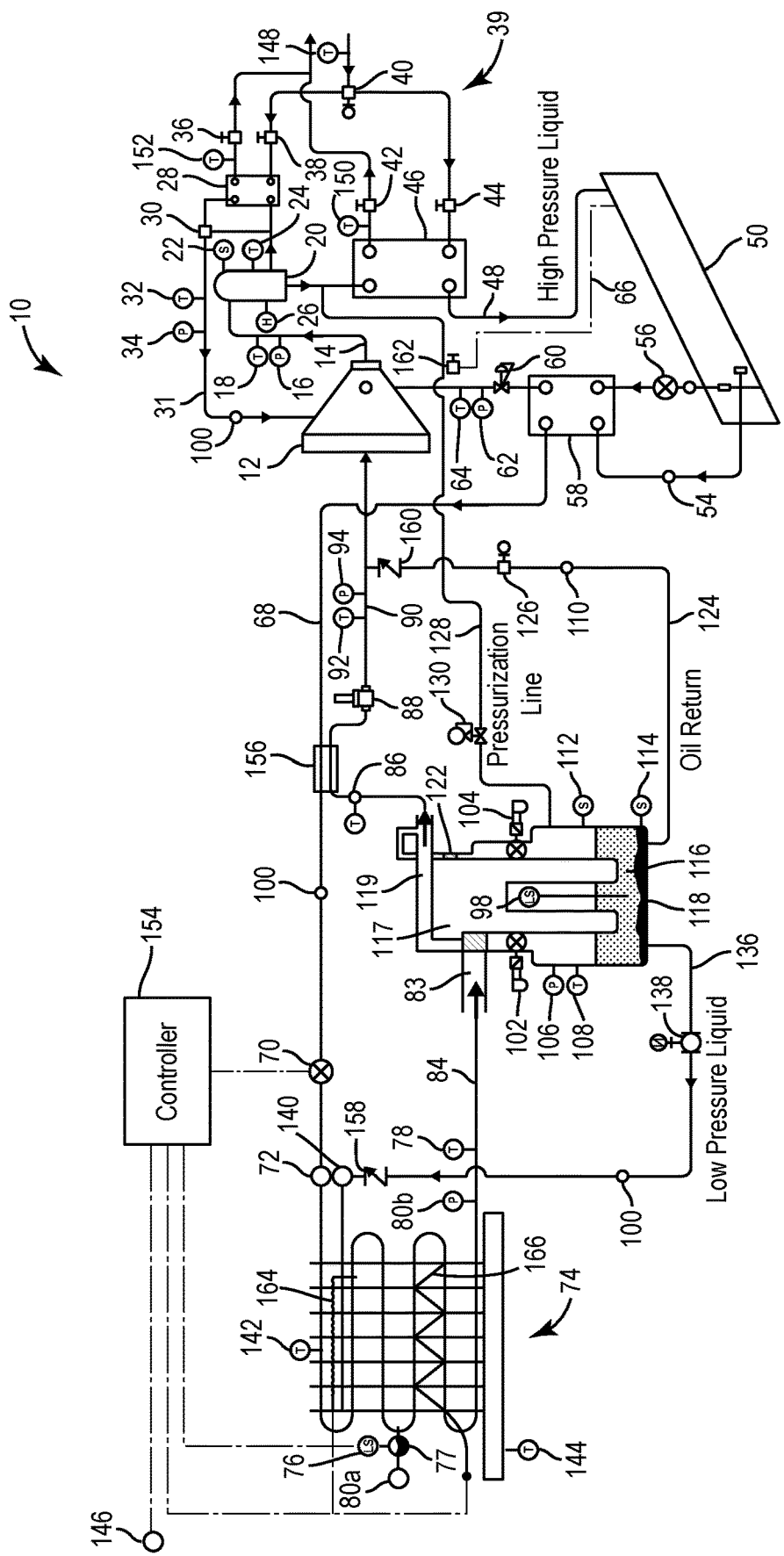
FIG. 1B is another block diagram of the refrigeration system of FIG. 1A in which the liquid refrigerant trap is replaced with a gravity drain, according to some embodiments.

Referring particularly to FIGS. 1A-1B, a refrigeration system 10 is shown, according to an exemplary embodiment. Refrigeration system 10 may be configured to circulate a refrigerant through a vapor compression cycle to provide cooling for a cooling load (e.g., a refrigerated display case, a refrigerator, a freezer, a refrigerated/cooled space, a building space, etc.). Refrigeration system 10 is shown to include a compressor 12, an expansion valve 70, an evaporator 74, a condenser 46, an economizer heat exchanger 58, an oil separator 20, an oil cooler heat exchanger 28, a liquid collector 50, a liquid/vapor separator 118, a suction liquid heat exchanger 156, and a variety of valves, sensors, and other components, as described in greater detail below. Refrigeration system 10 may include a controller 154 configured to receive measurements from any sensors of refrigeration system 10 (e.g., temperature sensors, pressure sensors, refrigerant quality sensors, refrigerant level sensors, oil level sensors, etc.) and operate any controllable components of refrigeration system 10 (e.g., compressor 12, valves, electric heating elements, etc.) to carry out the various functions of refrigeration system 10 described herein.

Compressor 12 may be configured to circulate a refrigerant within a refrigeration circuit that connects the various components of refrigeration system 10 via a system of pipes, tubes, lines, or other fluid conduits. In some embodiments, the refrigerant is ammonia ($NH_3$) or an ammonia-based refrigerant. In other embodiments, the refrigerant may be carbon dioxide ($CO_2$), R134a, R407c, R404a, R410a, or any other type of refrigerant. The refrigerant may be mixed with oil at some locations within refrigeration system 10. Accordingly, it should be understood that any references to "the refrigerant," "liquid refrigerant," "vapor refrigerant," or similar terms in the present disclosure may denote either pure refrigerant or a mixture of refrigerant and oil, depending on whether the refrigerant is mixed with oil at the corresponding location within refrigeration system 10.

Compressor 12 may draw or receive a vapor refrigerant from a suction line 90 that connects liquid/vapor separator 118 to compressor 12. In some embodiments, a suction temperature sensor 92 and/or a suction pressure sensor 94 may be located along suction line 90 and configured to measure a temperature and/or pressure of the vapor refrigerant within suction line 90 proximate the inlet of compressor 12. A suction flow modulation valve 88 may be positioned along suction line 90 and configured to modulate (e.g., control, adjust, increase, decrease, etc.) a flow of the vapor refrigerant through suction line 90. In some embodiments, suction line 90 passes through a suction liquid heat exchanger 156 that transfers heat from the high pressure liquid refrigerant in high pressure liquid line 68 to the vapor refrigerant in suction line 90. A high level cutout sensor 86 may be located along suction line 90 upstream of suction liquid heat exchanger 156 (e.g., between liquid/vapor separator 118 and suction liquid heat exchanger 156) and configured to measure the temperature of the vapor refrigerant at the location of high level cutout sensor 86.

In some embodiments, compressor 12 may also draw the refrigerant from economizer heat exchanger 58 to force or drive the refrigerant through one side of economizer heat exchanger 58 (i.e., the right-most side of economizer heat exchanger 58 shown in FIG. 1A). Compressor 12 can be fluidly coupled with economizer heat exchanger 58 through a pipe, a line, a conduit, etc. An economizer pressure regulating valve 60 may be positioned between compressor 12 and a discharge side or outlet of economizer heat exchanger 58. Pressure regulating valve 60 can be operated (e.g., by controller 154) to ensure that refrigerant within the line between compressor 12 and economizer heat exchanger 58 has a specific or desired pressure. In some embodiments, refrigeration system 10 includes an economizer temperature sensor 64 and/or an economizer pressure sensor 62. Economizer temperature sensor 64 may be positioned along the line between compressor 12 and economizer heat exchanger 58 and configured to measure a temperature of the refrigerant drawn from economizer heat exchanger 58 to compressor 12. Similarly, economizer pressure sensor 62 may be positioned along the line between compressor 12 and economizer heat exchanger 58 and is configured to measure a pressure of the refrigerant drawn from economizer heat exchanger 58 to compressor 12.

In some embodiments, compressor 12 is fluidly coupled to an oil return line 31 that returns oil from oil separator 20 to compressor 12. Oil return line 31 may pass through an oil cooler heat exchanger 28 that transfers heat from the oil within oil return line 31 to a coolant (e.g., water, glycol, a refrigerant, etc.) that circulates within a coolant circuit 39 (described in greater detail below). In some embodiments, a first portion of the oil from oil separator 20 passes through oil cooler heat exchanger 28 whereas a second portion of the oil from oil separator bypasses oil cooler heat exchanger 28. Mixing valve 30 can be operated to control the amount of oil routed through oil cooler heat exchanger 28 and the amount of oil that bypasses oil cooler heat exchanger 28. In some embodiments, an oil temperature sensor 32 and/or an oil pressure sensor 34 are located along oil return line 31 and configured to measure the temperature and/or pressure of the oil returning to compressor 12. A liquid/oil sight glass 100 may also be located along oil return line 31 in some embodiments and configured to allow a user to see the flow of oil through oil return line 31.

Compressor 12 may be configured to compress or pressurize the refrigerant received from suction line 90 and/or economizer heat exchanger 58 and discharge the refrigerant as a hot compressed gas into a discharge line 14. The refrigerant within compressor 12 may mix with the oil returned to compressor 12 via oil return line 31 to increase the amount of oil in the refrigerant, or alternatively add oil to pure refrigerant, depending on whether the refrigerant received from suction line 90 and/or economizer heat exchanger 58 is already mixed with oil. The hot compressed gas refrigerant exiting compressor 12 may be provided to oil separator 20 via discharge line 14. In some embodiments, a discharge temperature sensor 18 and/or a discharge pressure sensor 16 are positioned along discharge line 14 and configured to measure a temperature and/or a pressure of the refrigerant within discharge line 14.

Oil separator 20 may be configured to separate at least some of the oil from the hot compressed refrigerant. In some embodiments, oil separator 20 includes an oil level sensor 22 configured to measure a level of oil within oil separator 20, an oil temperature sensor 24 configured to measure a temperature of the oil within oil separator 20, and/or an oil heater (e.g., a resistive heating element) configured to heat the oil within oil separator 20. The oil separated from the refrigerant within oil separator 20 may be returned to compressor 12 via oil return line 31, as previously described. The refrigerant exiting oil separator 20 may be directed to condenser 46.

Condenser 46 may be configured to cool and/or condense the hot compressed gas refrigerant into a high pressure liquid by removing heat from the refrigerant. Condenser 46 may be or include any of a variety of heat exchangers (e.g., air cooled, water cooled, adiabatic, plate-to-plate, fin and tube, microchannel, etc.) configured to remove heat from the refrigerant. In some embodiments, condenser 46 is coupled to a coolant circuit 39 that circulates a coolant (e.g., water, glycol, another refrigerant, etc.) through condenser 46 to provide cooling for the refrigerant. The high pressure liquid refrigerant may exit condenser 46 via a condenser liquid drop leg 48 that connects condenser 46 to liquid collector 50.

Coolant circuit 39 can be configured to circulate a coolant through oil cooler heat exchanger 28 and condenser 46 to provide cooling for the oil and refrigerant. Coolant circuit 39 is shown to include an oil cooler inlet valve 38 and an oil cooler outlet valve 36 operable to control the flow of coolant through oil cooler heat exchanger 28. Coolant circuit 39 may also include a condenser inlet valve 44 and a condenser outlet valve 42 operable to control the flow of coolant through condenser 46. In some embodiments, coolant circuit 39 includes a two-way or three-way modulating valve 40 operable to direct the coolant to oil cooler heat exchanger 28 or condenser 46. Temperature sensor 148 can be positioned to measure the coolant inlet temperature of the coolant provided to oil cooler heat exchanger 28 and condenser 46, whereas temperature sensors 150 and 152 can be positioned to measure the coolant outlet temperatures at the outlets of condenser 46 and oil cooler heat exchanger 28, respectively. Controller 154 can be configured to operate valves 36-42 to control the flow of coolant through coolant circuit 39, based on the temperature measurements obtained by temperature sensors 148-152.

Liquid collector 50 may be configured to collect the high pressure liquid refrigerant received from condenser 46 via condenser liquid drop leg 48. In some embodiments, liquid collector 50 includes a first outlet fluidly coupled to a first side of economizer heat exchanger 58 (i.e., the left side of economizer heat exchanger 58 shown in FIG. 1A) and a second outlet fluidly coupled to a second side of economizer heat exchanger 58 (i.e., the right side of economizer heat exchanger 58 shown in FIG. 1A). A liquid sight glass 54 may be located along a refrigerant line connecting liquid collector 50 to the first side of economizer heat exchanger 58. An economizer expansion valve 56 (e.g., an electronic expansion valve, a liquid feed modulating valve, etc.) may be located between liquid collector 50 and the second side of economizer heat exchanger 58 and configured to expand the high pressure liquid refrigerant to a lower temperature, lower pressure state. This creates a temperature differential between the first and second sides of economizer heat exchanger 58 to induce heat transfer from the warmer high pressure liquid refrigerant on the first side of economizer heat exchanger 58 to the cooler lower pressure refrigerant in the second side of economizer heat exchanger 58, thereby providing cooling for the high pressure liquid refrigerant on the first side of economizer heat exchanger 58.

The high pressure liquid refrigerant exiting the first side of economizer heat exchanger 58 may be directed to expansion valve 70 via a high pressure liquid line 68. In some embodiments, a suction liquid heat exchanger 156 is located along high pressure liquid line 68 and configured to transfer heat from the high pressure liquid refrigerant in high pressure liquid line 68 to the lower temperature refrigerant in suction line 90. Another liquid/oil sight glass 100 may be located along high pressure liquid line to allow a user to see the high pressure liquid refrigerant within high pressure liquid line 68.

Expansion valve 70 may be configured to expand the high pressure liquid refrigerant within high pressure liquid line 68 to a lower temperature, lower pressure state and provide the expanded refrigerant to evaporator 74. Expansion valve 70 may be any type of controllable valve (e.g., an electronic expansion valve, a liquid feed modulating valve, etc.) configured to control the flow of refrigerant into evaporator 74. In some embodiments, controller 154 is configured to operate expansion valve 70 based on or using a liquid level $L_1$ obtained (e.g., measured, detected, sensed, calculated, etc.) by a liquid level sensor 112 positioned to measure the level of liquid refrigerant and/or oil within liquid/vapor separator 118. In some embodiments, controller 154 is configured to control expansion valve 70 using the liquid level $L_1$ measured by liquid level sensor 112 in combination with an oil level $L_2$ measured by oil level sensor 114 positioned to measure the level of oil within liquid/vapor separator 118. In some embodiments, controller 154 operates expansion valve 70 using a first refrigerant superheat temperature $T_{sh,1}$ obtained by a temperature sensor 78 located at an outlet of evaporator 74 and/or a second refrigerant superheat temperature $T_{sh,2}$ obtained by a suction temperature sensor 92 located proximate to the inlet of compressor 12 along suction line 90. The control operations performed by controller 154 to operate expansion valve 70 are described in greater detail below.

Evaporator 74 may be fluidly coupled to expansion valve 70 and configured to receive the expanded refrigerant from expansion valve 70 via a high pressure distributor 72 located between expansion valve 70 and evaporator 74. Evaporator 74 may be any of a variety of heat exchangers (e.g., fin-and-tube, microchannel, plate-to-plate, etc.) configured to place the expanded refrigerant in a heat exchange relationship with another fluid medium (e.g., air, water, glycol, another refrigerant, etc.) to transfer heat between the refrigerant and the other fluid medium. For example, evaporator 74 may be positioned within an airflow such that heat from the relatively warmer airflow is transferred into the relatively colder refrigerant within evaporator 74. The airflow can be routed into a temperature-controlled space (e.g., a refrigerator, a freezer, a refrigerated display case, a building space, etc.) to provide cooling for the temperature-controlled space. A temperature sensor 146 can be located within the temperature-controlled space and configured to provide temperature measurements to controller 154. In some embodiments, one or more temperature sensors are positioned within the airflow. For example, an evaporator suction air temperature sensor 142 may be positioned within the airflow upstream of evaporator 74 and configured to measure the temperature of the airflow before the airflow is passed over evaporator 74. Similarly, an evaporator discharge air temperature sensor 144 may be positioned within the airflow downstream of evaporator 74 and configured to measure the temperature of the airflow after the airflow is passed over evaporator 74.

In some embodiments, refrigeration system 10 includes a liquid collection header 77 and a liquid level sensor 76 located at evaporator 74 or proximate to evaporator 74. Liquid collection header 77 and liquid level sensor 76 may be positioned upstream of evaporator 74 (e.g., at an inlet of evaporator 74), downstream of evaporator 74 (e.g., at an outlet of evaporator 74), or within evaporator 74 (e.g., between the inlet and outlet of evaporator 74) in various embodiments. Liquid collection header 77 can be exposed to the refrigerant passing through evaporator 74 and configured to collect liquid refrigerant. Liquid level sensor 76 can be configured to measure the level (e.g., height, weight, amount, etc.) of liquid refrigerant collected within liquid collection header 77.

The level of liquid refrigerant within liquid collection header 77 may be related to the thermodynamic vapor quality of the refrigerant at the location of liquid collection header 77 and liquid level sensor 76 and/or the amount of superheat in the refrigerant at the outlet of evaporator 74. Accordingly, the level of liquid refrigerant within liquid collection header 77 may indicate the extent to which the refrigerant has evaporated within evaporator 74 and/or the amount of heat absorbed by the refrigerant within evaporator 74. For example, a relatively higher level of liquid refrigerant within liquid collection header 77 may indicate that the refrigerant has a relatively lower vapor quality (i.e., closer to a saturated liquid) and a relatively lower superheat at the outlet of evaporator 74, whereas a relatively lower level of liquid refrigerant within liquid collection header 77 may indicate that the refrigerant has a relatively higher vapor quality (i.e., closer to a saturated vapor) and a relatively higher superheat at the outlet of evaporator 74.

Advantageously, controller 154 can use the liquid level measurements recorded by liquid level sensor 76 to operate expansion valve 70. For example, controller 154 can be configured to maintain the level of liquid refrigerant within liquid collection header 77 at a liquid level setpoint (e.g., a single value or range of values) and may operate expansion valve 70 to drive the measured level of liquid refrigerant within liquid collection header 77 toward the liquid level setpoint. If the measured level of liquid within liquid collection header 77 is below the liquid level setpoint, controller 154 may open expansion valve 70 more (i.e., move expansion valve 70 toward an open position) to allow more refrigerant to flow into evaporator 74, causing the level of liquid refrigerant to increase toward the liquid level setpoint. Conversely, if the measured level of liquid within liquid collection header 77 is above the liquid level setpoint, controller 154 may close expansion valve 70 more to decrease the flow of refrigerant into evaporator 74, causing the level of liquid refrigerant to decrease toward the liquid level setpoint. The process executed by controller 154 to operate expansion valve 70 is described in greater detail with reference to FIG. 15.

In some embodiments, refrigeration system 10 includes a temperature sensor 78 and a pressure sensor 80b located at the outlet of evaporator 74 or between evaporator 74 and liquid/vapor separator 118. Temperature sensor 78 and pressure sensor 80b can be configured to measure the temperature and pressure of the refrigerant at the outlet of evaporator 74. Controller 154 can use the measurements from temperature sensor 78 and pressure sensor 80b to calculate the amount of superheat in the refrigerant (if any) at the location of temperature sensor 78 and pressure sensor 80b. In some embodiments, controller 154 uses the amount of superheat, alone or in combination with the liquid level measurement from liquid level sensor 76, to operate expansion valve 70. For example, controller 154 can be configured to maintain the superheat of the refrigerant at the outlet of evaporator 74 at a superheat setpoint (e.g., a single value or range of values) and may operate expansion valve 70 to drive the amount of superheat toward the superheat setpoint. If the amount of superheat is above the superheat setpoint, controller 154 may open expansion valve 70 more (i.e., move expansion valve 70 toward an open position) to allow more refrigerant to flow into evaporator 74, causing the superheat of refrigerant to decrease toward the superheat setpoint. Conversely, if the amount of superheat is below the superheat setpoint, controller 154 may close expansion valve 70 more (i.e., move expansion valve 70 toward a closed position) to reduce the flow refrigerant into evaporator 74, causing the superheat of refrigerant to increase toward the superheat setpoint.

In some embodiments, refrigeration system 10 includes a vapor quality sensor 80*a* located at evaporator 74 or proximate to evaporator 74. Vapor quality sensor 80*a* may be positioned upstream of evaporator 74 (e.g., at an inlet of evaporator 74), downstream of evaporator 74 (e.g., at an outlet of evaporator 74), or within evaporator 74 (e.g., between the inlet and outlet of evaporator 74) in various embodiments. Vapor quality sensor 80*a* may configured to measure the thermodynamic vapor quality of the refrigerant at evaporator 74 and, in some embodiments, may be a void fraction sensor. For example, a vapor quality of 0 (or 0%) indicates that the refrigerant is in a saturated liquid state, a vapor quality of 1 (or 100%) indicates that the refrigerant is in a saturated vapor state, and a vapor quality between 0 and 1 (or between 0% and 100%) indicates that the refrigerant is a partially saturated liquid-vapor mixture (i.e., within the vapor dome) at the location of vapor quality sensor 80*a*. In some embodiments, the measurement from vapor quality sensor 80*a* is directly proportional to the percentage of the refrigerant that is in a liquid state at the location of vapor quality sensor 80*a*. For example, a liquid percentage of 0% may indicate that the refrigerant is in a saturated vapor state, whereas a liquid percentage of 100% may indicate that the refrigerant is in a saturated liquid state. However, if the refrigerant has any superheat (i.e., a temperature above the saturation temperature), vapor quality sensor 80*a* may be unable to measure the superheat and may simply report a vapor quality of 100% or a liquid percentage of 0%.

In some embodiments, evaporator 74 includes an electric defrost heater 164 and/or an ice sensor 166. Electric defrost heater 164 may include an evaporator coil heater, a drain pan heater, or any other type of heating element configured to apply heat to evaporator 74. Ice sensor 166 can be configured to measure an amount (e.g., a thickness, a weight, etc.) of ice or frost accumulated on evaporator 74. Controller 154 may use measurements from ice sensor 166 to perform a defrost process, described in greater detail below.

The refrigerant exiting evaporator 74 may be directed into liquid/vapor separator 118. In some embodiments, a trap 82 is located along the refrigerant line connecting evaporator 74 to liquid/vapor separator 118, as shown in FIG. 1A. Trap 82 can be configured to collect or trap some or all of the refrigerant that exists in a liquid state at the location of trap 82 and direct the liquid refrigerant (which may include oil) into a lower portion of liquid/vapor separator 118 via a liquid/oil drain trap line 132. In some embodiments, a one-way valve 134 (e.g., a check valve) may be located along liquid/oil drain trap line 132. One-way valve 134 may be configured to allow the liquid refrigerant to flow from liquid/oil drain trap line 132 into liquid/vapor separator 118 and prevent reverse flow of the liquid refrigerant out of liquid/vapor separator 118. In the embodiment shown in FIG. 1A, liquid refrigerant may be directed into a lower portion of liquid/vapor separator 118 via liquid/oil drain trap line 132, whereas vapor refrigerant may be directed into an upper portion 117 of liquid/vapor separator 118 via separator inlet 83. In the embodiment shown in FIG. 1B, trap 82 may be replaced with a suction gravity drain 84 configured to direct all of the refrigerant into upper portion 117 of liquid/vapor separator 118 via separator inlet 83.

Liquid/vapor separator 118 is shown to include a separator inlet 83 through which refrigerant enters upper portion 117 of liquid/vapor separator 118 and a separator outlet 119 through which vapor refrigerant exits liquid/vapor separator 118. Separator outlet 119 may be fluidly coupled to suction line 90 and configured to deliver vapor refrigerant into suction line 90. In some embodiments, a high level cutout sensor 86 is located along suction line 90 proximate separator outlet 119. Transfer valves 102 and 104 connect upper portion 117 to separator outlet 119 and can be operated to control the flow of vapor refrigerant out of liquid/vapor separator 118. The refrigerant collects within an internal volume of liquid/vapor separator 118 and separates into vapor refrigerant, liquid refrigerant, and oil. A demister 96 may be positioned within liquid/vapor separator 118 to help separate liquid refrigerant and oil from the vapor refrigerant. The vapor refrigerant has a lesser density than the liquid refrigerant and the oil and gathers within upper portion 117. The oil has a greater density than the vapor refrigerant and the liquid refrigerant and settles at the bottom of liquid/vapor separator 118. The liquid refrigerant has a density between the density of the vapor refrigerant and the density of the oil and settles above the oil but below the vapor refrigerant within liquid/vapor separator 118.

Liquid/vapor separator 118 is shown to include a liquid level sensor 98. Liquid level sensor 98 can be configured to measure the level (e.g., height, weight, amount, etc.) of liquid refrigerant collected within liquid/vapor separator 118. The level of liquid refrigerant within liquid/vapor separator 118 may be related to the thermodynamic vapor quality of the refrigerant within liquid/vapor separator 118 and/or the amount of superheat in the refrigerant at the outlet of evaporator 74. Accordingly, the level of liquid refrigerant within liquid/vapor separator 118 may indicate the extent to which the refrigerant has evaporated within evaporator 74 and/or the amount of heat absorbed by the refrigerant within evaporator 74. For example, a relatively higher level of liquid refrigerant within liquid/vapor separator 118 may indicate that the refrigerant has a relatively lower vapor quality (i.e., closer to a saturated liquid) and a relatively lower superheat at the outlet of evaporator 74, whereas a relatively lower level of liquid refrigerant within liquid/vapor separator 118 may indicate that the refrigerant has a relatively higher vapor quality (i.e., closer to a saturated vapor) and a relatively higher superheat at the outlet of evaporator 74.

Advantageously, controller 154 can use the liquid level measurements recorded by liquid level sensor 98 to operate expansion valve 70. For example, controller 154 can be configured to maintain the level of liquid refrigerant within liquid/vapor separator 118 at a liquid level setpoint (e.g., a single value or range of values) and may operate expansion valve 70 to drive the measured level of liquid refrigerant within liquid/vapor separator 118 toward the liquid level setpoint. If the measured level of liquid within liquid/vapor separator 118 is below the liquid level setpoint, controller 154 may open expansion valve 70 more (i.e., move expansion valve 70 toward an open position) to allow more refrigerant to flow into evaporator 74, causing the level of liquid refrigerant to increase toward the liquid level setpoint. Conversely, if the measured level of liquid within liquid/vapor separator 118 is above the liquid level setpoint, controller 154 may close expansion valve 70 more to decrease the flow of refrigerant into evaporator 74, causing the level of liquid refrigerant to decrease toward the liquid level setpoint.

In some embodiments, liquid/vapor separator 118 includes a liquid level sensor 112 and an oil level sensor 114. Liquid level sensor 112 can be configured to measure a liquid level $L_1$ of the liquid refrigerant and oil within liquid/vapor separator 118 (e.g., a total level of the liquid refrigerant and oil combined). Oil level sensor 114 can be configured to measure an oil level $L_2$ of the oil within liquid/vapor separator 118. Controller 154 may receive the level measurements $L_1$ and $L_2$ from sensors 112-114 and subtract the oil level $L_2$ from the liquid level $L_1$ to calculate the level of liquid refrigerant $L_3$ within liquid/vapor separator 118 (i.e., $L_3=L_1-L_2$). In some embodiments, liquid/vapor separator 118 includes a temperature sensor 108 and/or a pressure sensor 106 positioned to measure the temperature and/or pressure of the refrigerant within liquid/vapor separator 118. A suction chamber heater 116 may be located within liquid/vapor separator 118 and configured to heat the refrigerant within liquid/vapor separator 118 in some embodiments.

In some embodiments, a low pressure liquid return line 136 fluidly couples the lower portion of liquid/vapor separator 118 to evaporator 74 and delivers low pressure liquid refrigerant from liquid/vapor separator 118 to evaporator 74 via a low pressure distributor 140. A low pressure liquid return valve 138 may be located along low pressure liquid return line 136 (e.g., between liquid/vapor separator 118 and low pressure distributor 140) and can be operated to control the flow of the low pressure liquid refrigerant through low pressure liquid return line 136. In some embodiments, another liquid/oil sight glass 100 is located along low pressure liquid return line 136 and allows a user to view the flow of the low pressure liquid refrigerant through low pressure liquid return line 136. A low pressure liquid return check valve 158 (e.g., a one-way valve) may also be located along low pressure liquid return line 136 and configured to allow the flow of liquid refrigerant from liquid/vapor separator 118 to evaporator 74, and prevent reverse flow of the liquid refrigerant from evaporator 74 to liquid/vapor separator 118.

In some embodiments, an oil return line 124 fluidly couples the lower portion of liquid/vapor separator 118 to suction line 90 and delivers oil from liquid/vapor separator 118 to compressor 12 via suction line 90. An oil return valve 126 may be located along oil return line 124 (e.g., between liquid/vapor separator 118 and suction line 90) and can be operated to control the flow of the oil through oil return line 124. In some embodiments, an oil sight glass 110 is located along oil return line 124 and allows a user to view the flow of oil through oil return line 124. An oil return check valve 160 (e.g., a one-way valve) may also be located along oil return line 124 and configured to allow the flow of oil from liquid/vapor separator 118 to suction line 90, and prevent reverse flow of the oil from suction line 90 to liquid/vapor separator 118. Controller 154 can be configured to operate various components of refrigeration system 10 to control the flow of liquid refrigerant to evaporator 74 via low pressure liquid return line 136 and/or the flow of oil to compressor 12 via oil return line 124.

In some embodiments, a gas pressurization line 128 fluidly couples liquid/vapor separator 118 to a high pressure source. For example, one end of gas pressurization line 128 may be connected to liquid/vapor separator 118 whereas another end of gas pressurization line 128 may be connected to discharge line 14 (upstream or downstream of oil separator 20), condenser liquid drop leg 48, high pressure liquid line 68, or any other location within refrigeration system 10 at which the refrigerant has a pressure greater than the pressure within liquid/vapor separator 118. A pressure regulating valve 130 (e.g., a solenoid valve, a one-way adjustable valve, etc.) may be located along gas pressurization line 128 and can be operated to connect or disconnect liquid/vapor separator 118 from the high pressure source. In some embodiments, an equalization line 66 connects gas pressurization line 128 to liquid collector 50. A gas vent valve 162 may be located along equalization line 66 and can be operated to control the flow of gas between gas pressurization line 128 and liquid collector 50.

Figure 7:
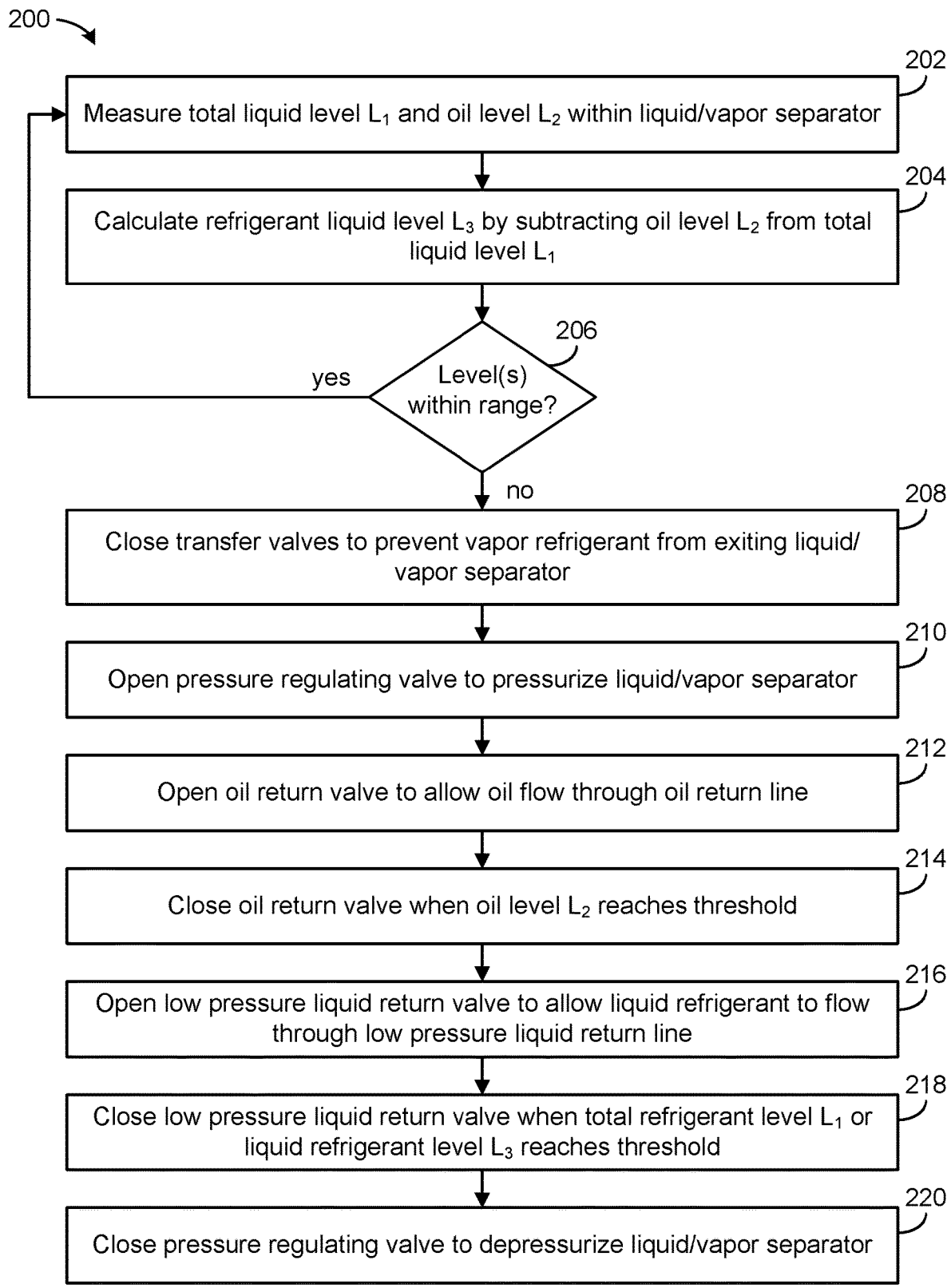
FIG. 7 is a flowchart of a process which can be performed by a controller of the refrigeration system of FIG. 1A to return liquid refrigerant to an evaporator of the refrigeration system and return oil to a compressor of the refrigeration system, according to some embodiments.

Referring now to FIG. 7, a flowchart of a process 200 performed by controller 154 to return liquid refrigerant from liquid/vapor separator 118 to evaporator 74 and/or return oil from liquid/vapor separator 118 to compressor 12 is shown, according to an exemplary embodiment. Process 200 may be performed by controller 154 by operating various components of refrigeration system 10, as shown in FIGS. 1A-1B. Process 200 is shown to include measuring the total liquid level $L_1$ and oil level $L_2$ within liquid/vapor separator 118 (step 202). Step 202 may be performed using the measurements from sensors 112-114. Controller 154 may subtract the oil level $L_2$ from the total liquid level $L_1$ to calculate the level of liquid refrigerant $L_3$ within liquid/vapor separator 118 (i.e., $L_3=L_1-L_2$) (step 204).

Controller 154 may compare any of the liquid levels $L_1$, $L_2$, and/or $L_3$ to one or more threshold limits to determine whether any of the liquid levels $L_1$, $L_2$, and/or $L_3$ are within threshold limits (e.g., below a minimum level threshold, above a maximum level threshold, outside a threshold range, etc.) (step 206). If all of the liquid levels $L_1$, $L_2$, and/or $L_3$ are within threshold limits, controller 154 may end process 200 or return to step 202 without returning any liquid refrigerant or oil. If one or more of the liquid levels $L_1$, $L_2$, and/or $L_3$ is not within threshold limits, controller 154 may proceed to closing transfer valves 102 and 104 to prevent vapor refrigerant from exiting liquid/vapor separator 118 via separator outlet 119 (step 208). Controller 154 may open pressure regulating valve 130 to connect liquid/vapor separator 118 to the high pressure source (e.g., discharge line 14), thereby pressurizing liquid/vapor separator 118 (step 210). Because transfer valves 102 and 104 are closed, the increased pressure does not force vapor refrigerant out of liquid/vapor separator 118.

To return oil to compressor 12, controller 154 may open oil return valve 126 to allow the oil to flow through oil return line 124 (step 212). The increased pressure within liquid/vapor separator 118 causes the oil at the bottom of liquid/vapor separator 118 to flow out of liquid/vapor separator 118, into oil return line 124, through oil return check valve 160, and into suction line 90. The oil may mix with vapor refrigerant in suction line 90 and disperse within the vapor refrigerant. The mixture of oil and vapor refrigerant may then be fed into compressor 12 via suction line to return the oil to compressor 12. While the oil is flowing through oil return line 124, controller 154 may monitor the oil level $L_2$ and close oil return valve 126 in response to the oil level $L_2$ reaching a threshold (step 214). The threshold used in step 214 may be the same threshold used in step 206 or a different threshold, greater than or less than the threshold used in step 206.

To return liquid refrigerant to evaporator 74, controller 154 may open low pressure liquid return valve 138 to allow the liquid refrigerant to flow through low pressure liquid return line 136 (step 216). The increased pressure within liquid/vapor separator 118 causes the liquid refrigerant within liquid/vapor separator 118 to flow out of liquid/vapor separator 118, into low pressure liquid return line 136, through low pressure liquid return check valve 158, and into evaporator 74. Low pressure distributor 140 may act to distribute the liquid refrigerant from low pressure liquid return line 136 into evaporator 74. While the liquid refrigerant is flowing through low pressure liquid return line 136, controller 154 may monitor the total liquid level $L_1$ and/or the liquid refrigerant level $L_3$ (which can be recalculated based on updated measurements from sensors 112-114) and may close low pressure liquid return valve 138 in response to the total liquid level $L_1$ and/or the liquid refrigerant level $L_3$ reaching a threshold (step 218). The threshold used in step 218 may be the same threshold used in step 206 or a different threshold, greater than or less than the threshold used in step 206.

In some embodiments, controller 154 may return oil to compressor 12 without returning liquid refrigerant to evaporator 74 by omitting steps 216-218 from process 200. Similarly, controller 154 may return liquid refrigerant to evaporator 74 without returning oil to compressor 12 by omitting steps 212-214 from process 200. In some embodiments, controller 154 automatically determines whether to omit any of steps 212-218 from process 200 based on the measurements from sensors 112-114. For example, if the oil level $L_2$ is within threshold limits but the liquid refrigerant level $L_3$ is not within threshold limits, controller 154 may automatically omit steps 212-214 from process 200. Similarly, if the liquid refrigerant level $L_3$ is within threshold limits but the oil level $L_2$ is not within threshold limits, controller 154 may automatically omit steps 216-218 from process 200. Upon completing the oil return process (steps 212-214) and/or the liquid refrigerant return process (steps 216-218) controller 154 may open pressure regulating valve 130 to depressurize liquid/vapor separator 118 (step 220). Advantageously, executing process 200 to return low pressure liquid refrigerant to evaporator 74 may increase the efficiency of refrigeration system 10 by 10%-20%.

Oil Return System

Figure 1C:
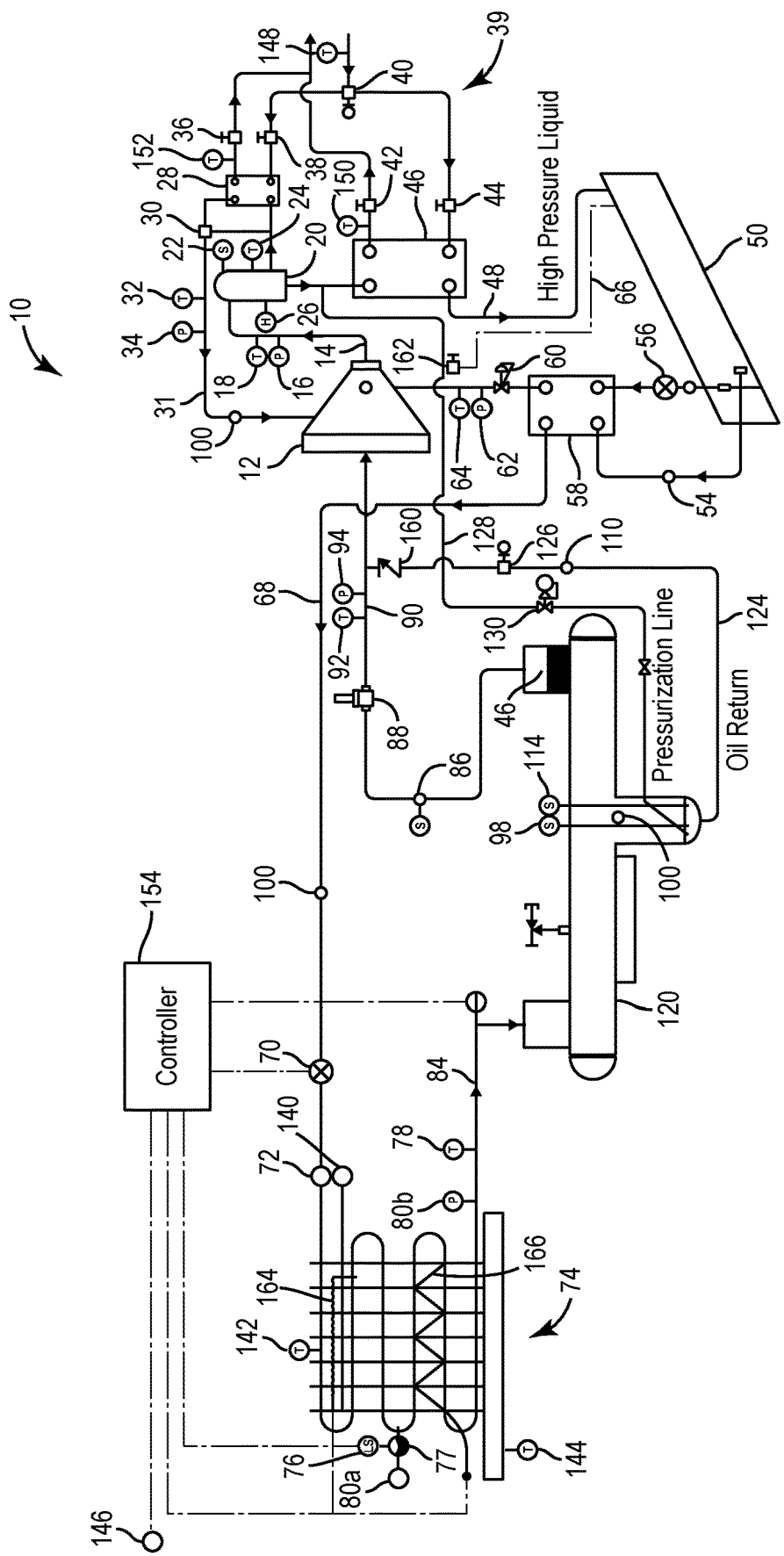
FIG. 1C is another block diagram of the refrigeration system of FIG. 1A in which the liquid/vapor separator is replaced with a separator vessel, according to some embodiments.

Referring now to FIG. 1C, another embodiment of refrigeration system 10 is shown in which liquid/vapor separator 118 is replaced with an alternative separator vessel 120. Like liquid/vapor separator 118, separator vessel 120 may be configured to receive refrigerant (e.g., a mixture of vapor refrigerant, liquid refrigerant, and oil) from evaporator 74 and separate the vapor refrigerant, liquid refrigerant, and oil from each other. The oil may be returned to compressor 12 via oil return line 124 as described with reference to FIGS. 1A-1B. However, the liquid refrigerant collected within separator vessel 120 may not be returned to evaporator 74, but rather may be boiled off using discharge gas from compressor 12. The other components shown in FIG. 1C may be the same as or similar to the like-numbered components shown in FIGS. 1A-1B and may function in the same manner as described with reference to FIGS. 1A-1B.

Figure 8:
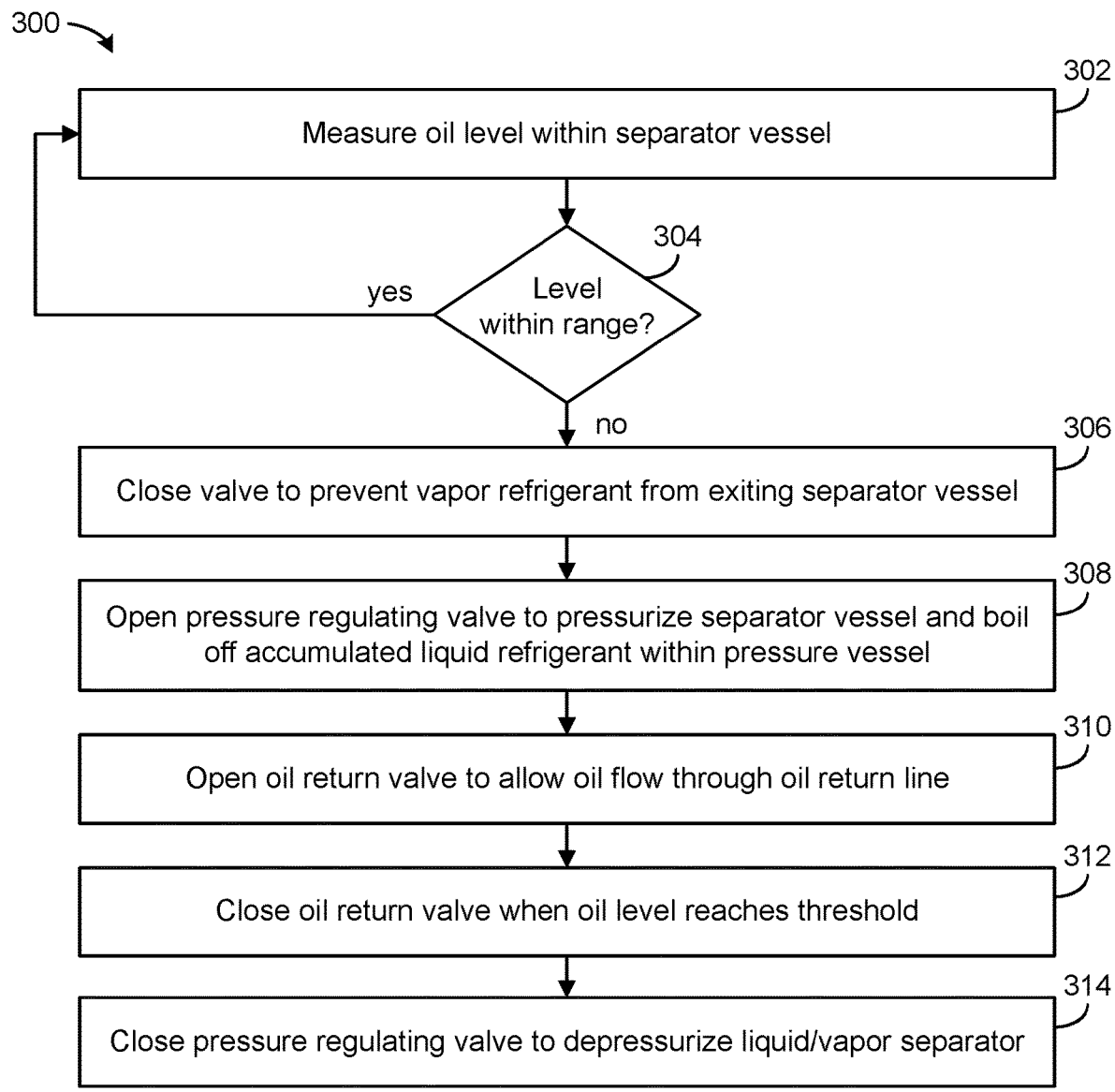
FIG. 8 is a flowchart of another process which can be performed by the controller of the refrigeration system of FIG. 1A to return oil to the compressor of the refrigeration system, according to some embodiments.

Referring now to FIG. 8, a flowchart of a process 300 performed by controller 154 to return oil from separator vessel 120 to compressor 12 is shown, according to an exemplary embodiment. Process 300 may be performed by controller 154 by operating various components of refrigeration system 10, as shown in FIG. 1C. Process 200 is shown to include measuring the oil level within separator vessel 120 (step 302). Step 302 may be performed using the measurements from oil level sensor 114.

Controller 154 may compare the oil level to one or more threshold limits to determine whether the oil level is within threshold limits (e.g., below a minimum level threshold, above a maximum level threshold, outside a threshold range, etc.) (step 304). If the oil level is within threshold limits, controller 154 may end process 300 or return to step 302 without returning any oil. If the oil level is not within threshold limits, controller 154 may proceed to closing a valve (e.g. valve 88) to prevent vapor refrigerant from separator vessel 120 via demister 96 (step 306). Controller 154 may open pressure regulating valve 130 to connect separator vessel 120 to the high pressure source (e.g., discharge line 14) via gas pressurization line 128, thereby pressurizing separator vessel 120 (step 308). Because valve 88 is closed, the increased pressure does not force vapor refrigerant out of separator vessel 120. In some embodiments, high pressure hot refrigerant from discharge line 14 enters separator vessel 120 via gas pressurization line 128. The added heat from the hot refrigerant may cause any liquid refrigerant within separator vessel 120 to boil off and become vapor refrigerant.

To return oil to compressor 12, controller 154 may open oil return valve 126 to allow the oil to flow through oil return line 124 (step 310). The increased pressure within liquid/vapor separator 118 causes the oil at the bottom of separator vessel 120 to flow out of liquid/vapor separator 118, into oil return line 124, through oil return check valve 160, and into suction line 90. The oil may mix with vapor refrigerant in suction line 90 and disperse within the vapor refrigerant. The mixture of oil and vapor refrigerant may then be fed into compressor 12 via suction line to return the oil to compressor 12. While the oil is flowing through oil return line 124, controller 154 may monitor the oil level and close oil return valve 126 in response to the oil level $L_2$ reaching a threshold (step 312). The threshold used in step 312 may be the same threshold used in step 304 or a different threshold, greater than or less than the threshold used in step 304. Controller 154 may then open pressure regulating valve 130 to depressurize separator vessel 120 (step 314).

Low Pressure Liquid Refrigerant and Oil Return System with Pump

Figure 2:
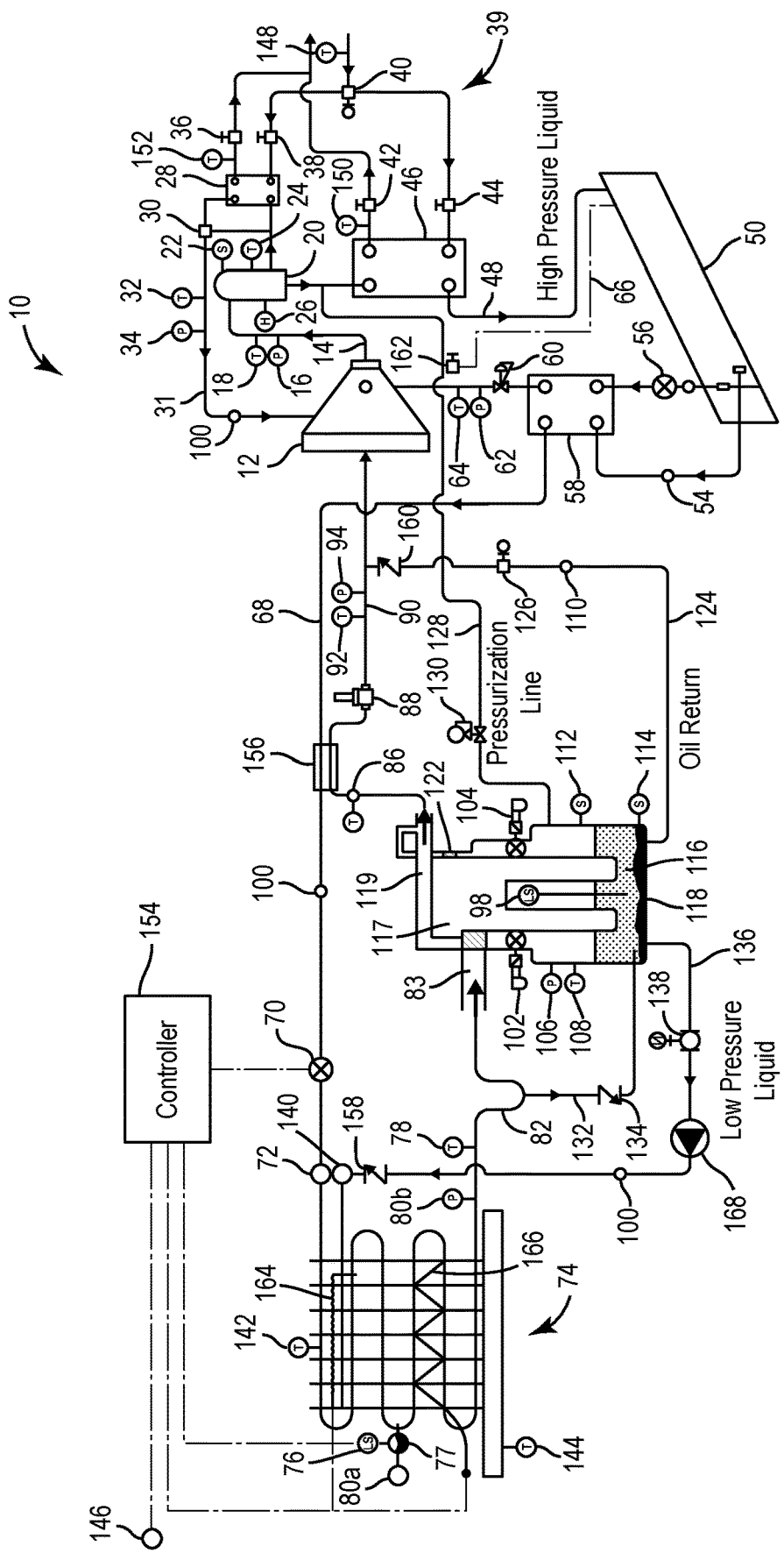
FIG. 2 is another block diagram of the refrigeration system of FIG. 1A including a liquid refrigerant pump, according to some embodiments.

Referring now to FIG. 2, another embodiment of refrigeration system 10 is shown in which a liquid refrigerant pump 168 is located along low pressure liquid return line 136. Liquid refrigerant pump 168 may be located upstream of low pressure liquid return valve 138 (e.g., between liquid/vapor separator 118 and low pressure liquid return valve 138) or downstream of low pressure liquid return valve 138 (e.g., between low pressure liquid return valve 138 and evaporator 74) in various embodiments. Liquid refrigerant pump 168 can be configured to pump the low pressure liquid refrigerant from liquid/vapor separator 118 through low pressure liquid return line 136 and into evaporator 74 via low pressure distributor 140. The other components shown in FIG. 2 may be the same as or similar to the like-numbered components shown in FIGS. 1A-1C and may function in the same manner as described with reference to FIGS. 1A-1C.

Although FIG. 2 shows liquid refrigerant pump 168 added to the embodiment of refrigeration system 10 shown in FIG. 1A (i.e., FIG. 2 shows a variation of FIG. 1A), it is contemplated that liquid refrigerant pump 168 can be added to any of the embodiments of refrigeration system 10 described herein without departing from the teachings of the present disclosure. For example, it is contemplated that trap 82 shown in FIG. 2 may be replaced with a suction gravity drain 84 as shown in FIG. 1B. Additionally, although not explicitly shown in FIG. 2, it is contemplated that an oil pump similar to liquid refrigerant pump 168 can be added along oil return line 124 upstream or downstream of oil return valve 126. The oil pump can be operated to pump oil from within liquid/vapor separator 118 though oil return line 124 and into suction line 90.

Figure 9:
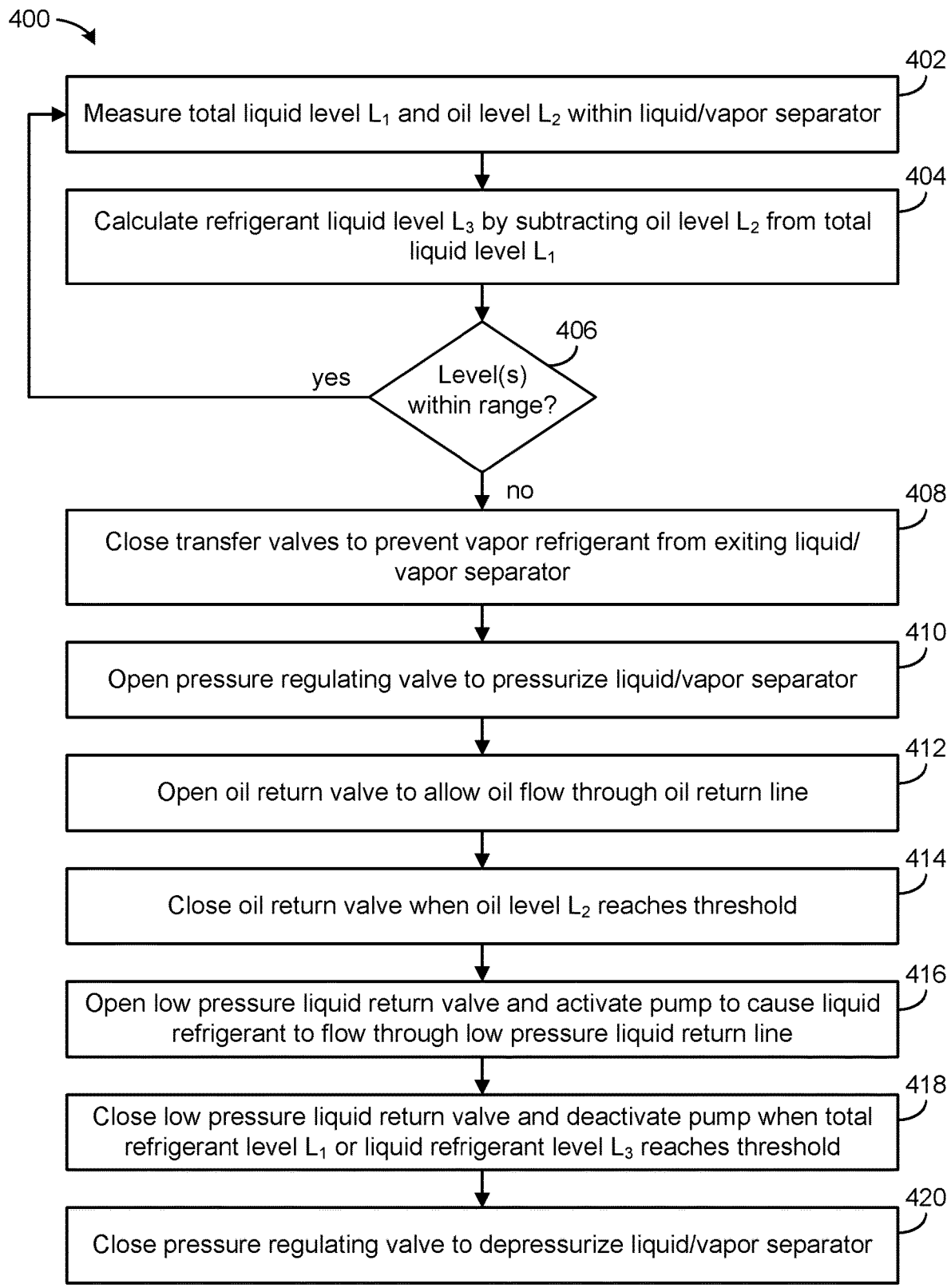
FIG. 9 is a flowchart of another process which can be performed by the controller of the refrigeration system of FIG. 1A to return liquid refrigerant to the evaporator of the refrigeration system and return oil to the compressor of the refrigeration system, according to some embodiments.

Referring now to FIG. 9, a flowchart of a process 400 performed by controller 154 to return liquid refrigerant from liquid/vapor separator 118 to evaporator 74 and/or return oil from liquid/vapor separator 118 to compressor 12 is shown, according to an exemplary embodiment. Process 400 may be performed by controller 154 by operating various components of refrigeration system 10, as shown in FIG. 2. Process 400 is shown to include measuring the total liquid level $L_1$ and oil level $L_2$ within liquid/vapor separator 118 (step 402). Step 402 may be performed using the measurements from sensors 112-114. Controller 154 may subtract the oil level $L_2$ from the total liquid level $L_1$ to calculate the level of liquid refrigerant $L_3$ within liquid/vapor separator 118 (i.e., $L_3=L_1-L_2$) (step 404).

Controller 154 may compare any of the liquid levels $L_1$, $L_2$, and/or $L_3$ to one or more threshold limits to determine whether any of the liquid levels $L_1$, $L_2$, and/or $L_3$ are within threshold limits (e.g., below a minimum level threshold, above a maximum level threshold, outside a threshold range, etc.) (step 406). If all of the liquid levels $L_1$, $L_2$, and/or $L_3$ are within threshold limits, controller 154 may end process 400 or return to step 402 without returning any liquid refrigerant or oil. If one or more of the liquid levels $L_1$, $L_2$, and/or $L_3$ is not within threshold limits, controller 154 may proceed to closing transfer valves 102 and 104 to prevent vapor refrigerant from exiting liquid/vapor separator 118 via separator outlet 119 (step 408). Controller 154 may open pressure regulating valve 130 to connect liquid/vapor separator 118 to the high pressure source (e.g., discharge line 14), thereby pressurizing liquid/vapor separator 118 (step 410). Because transfer valves 102 and 104 are closed, the increased pressure does not force vapor refrigerant out of liquid/vapor separator 118.

To return oil to compressor 12, controller 154 may open oil return valve 126 to allow the oil to flow through oil return line 124 (step 412). The increased pressure within liquid/vapor separator 118 causes the oil at the bottom of liquid/vapor separator 118 to flow out of liquid/vapor separator 118, into oil return line 124, through oil return check valve 160, and into suction line 90. The oil may mix with vapor refrigerant in suction line 90 and disperse within the vapor refrigerant. The mixture of oil and vapor refrigerant may then be fed into compressor 12 via suction line to return the oil to compressor 12. While the oil is flowing through oil return line 124, controller 154 may monitor the oil level $L_2$ and close oil return valve 126 in response to the oil level $L_2$ reaching a threshold (step 414). The threshold used in step 414 may be the same threshold used in step 406 or a different threshold, greater than or less than the threshold used in step 406.

To return liquid refrigerant to evaporator 74, controller 154 may open low pressure liquid return valve 138 and activate liquid refrigerant pump 168 to cause the liquid refrigerant to flow through low pressure liquid return line 136 (step 416). The increased pressure within liquid/vapor separator 118 and the action of liquid refrigerant pump 168 causes the liquid refrigerant within liquid/vapor separator 118 to flow out of liquid/vapor separator 118, into low pressure liquid return line 136, through low pressure liquid return check valve 158, and into evaporator 74. Low pressure distributor 140 may act to distribute the liquid refrigerant from low pressure liquid return line 136 into evaporator 74. While the liquid refrigerant is flowing through low pressure liquid return line 136, controller 154 may monitor the total liquid level $L_1$ and/or the liquid refrigerant level $L_3$ (which can be recalculated based on updated measurements from sensors 112-114) and may close low pressure liquid return valve 138 and deactivate liquid refrigerant pump 168 in response to the total liquid level $L_1$ and/or the liquid refrigerant level $L_3$ reaching a threshold (step 418). The threshold used in step 418 may be the same threshold used in step 406 or a different threshold, greater than or less than the threshold used in step 406.

In some embodiments, controller 154 may return oil to compressor 12 without returning liquid refrigerant to evaporator 74 by omitting steps 416-418 from process 400. Similarly, controller 154 may return liquid refrigerant to evaporator 74 without returning oil to compressor 12 by omitting steps 412-414 from process 400. In some embodiments, controller 154 automatically determines whether to omit any of steps 412-418 from process 400 based on the measurements from sensors 112-114. For example, if the oil level $L_2$ is within threshold limits but the liquid refrigerant level $L_3$ is not within threshold limits, controller 154 may automatically omit steps 412-414 from process 400. Similarly, if the liquid refrigerant level $L_3$ is within threshold limits but the oil level $L_2$ is not within threshold limits, controller 154 may automatically omit steps 416-418 from process 400. Upon completing the oil return process (steps 412-414) and/or the liquid refrigerant return process (steps 416-418) controller 154 may open pressure regulating valve 130 to depressurize liquid/vapor separator 118 (step 420). Advantageously, executing process 400 to return low pressure liquid refrigerant to evaporator 74 may increase the efficiency of refrigeration system 10 by 10%-20%.

Low Pressure Liquid Refrigerant and Oil Return System with Liquid Ejector

Figure 3:
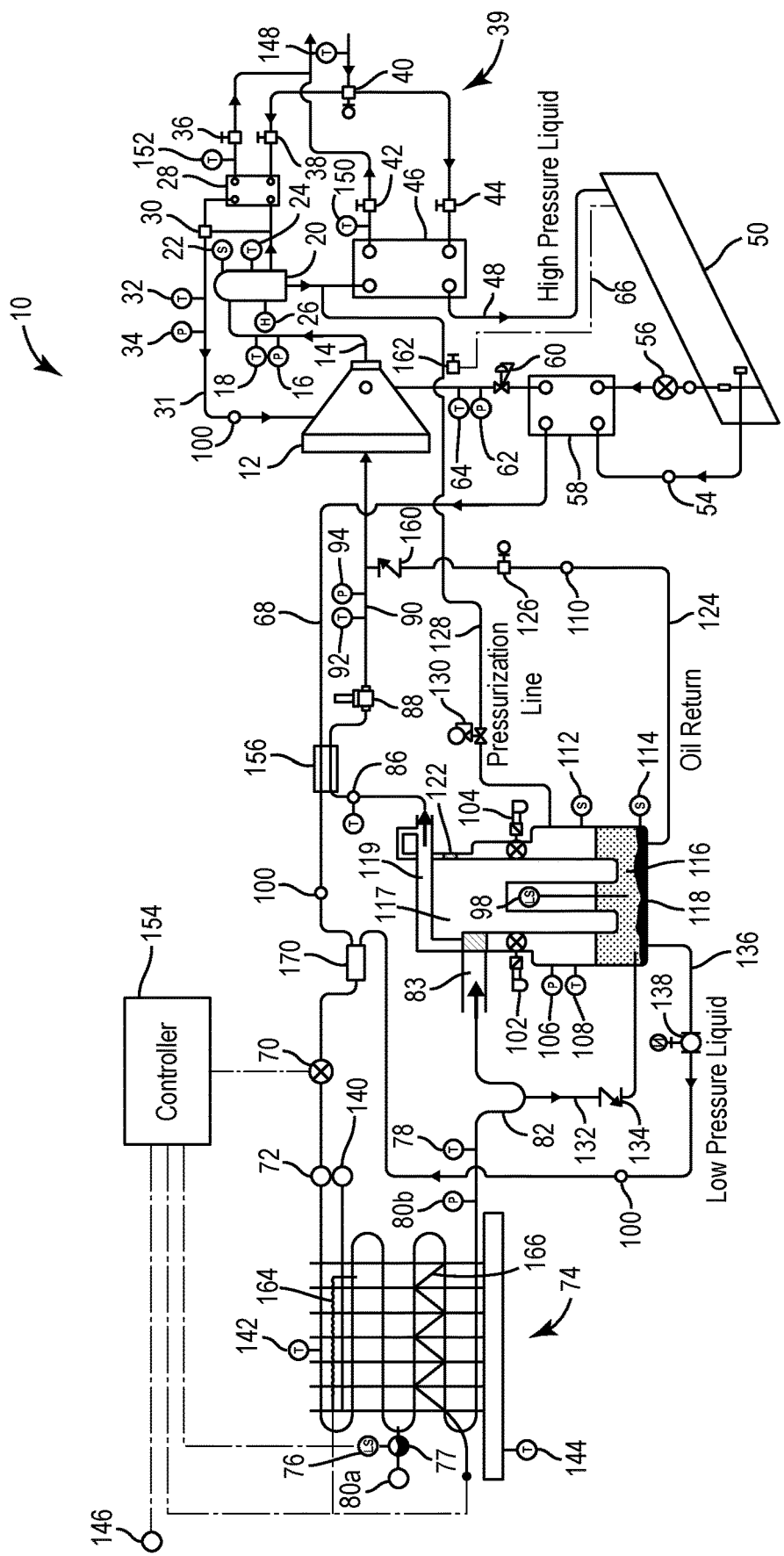
FIG. 3 is another block diagram of the refrigeration system of FIG. 1A including a liquid refrigerant ejector, according to some embodiments.

Referring now to FIG. 3, another embodiment of refrigeration system 10 is shown in which a liquid ejector 170 is located along high pressure liquid line 68 between economizer heat exchanger 58 and expansion valve 70. Liquid ejector 170 may be fluidly coupled to low pressure liquid return line 136 and may receive the low pressure liquid refrigerant from low pressure liquid return line 136 when controller 154 operates low pressure liquid return valve 138 and/or liquid refrigerant pump 168 to cause the liquid refrigerant to flow through low pressure liquid return line 136. Liquid ejector 170 can be configured to deliver the low pressure liquid refrigerant from low pressure liquid return line 136 into high pressure liquid line 68. Although the refrigerant within high pressure liquid line 68 has a higher pressure than the refrigerant within low pressure liquid return line 136, liquid ejector may overcome the pressure differential by pumping, ejecting, or otherwise forcing the lower pressure liquid refrigerant from low pressure liquid return line 136 into high pressure liquid line 68. The outlet of liquid ejector 170 may be fluidly coupled to expansion valve 70 such that the combined refrigerant exiting liquid ejector 170 is expanded by expansion valve 70 and delivered to evaporator 74. The other components shown in FIG. 3 may be the same as or similar to the like-numbered components shown in FIGS. 1A-2 and may function in the same manner as described with reference to FIGS. 1A-2.

Although FIG. 3 shows liquid ejector 170 added to the embodiment of refrigeration system 10 shown in FIG. 1A (i.e., FIG. 3 shows a variation of FIG. 1A), it is contemplated that liquid ejector 170 can be added to any of the embodiments of refrigeration system 10 described herein without departing from the teachings of the present disclosure. For example, it is contemplated that trap 82 shown in FIG. 3 may be replaced with a suction gravity drain 84 as shown in FIG. 1B. Additionally, liquid refrigerant pump 168 (shown in FIG. 2) can be used in the embodiment of refrigeration system 10 shown in FIG. 3.

Figure 10:
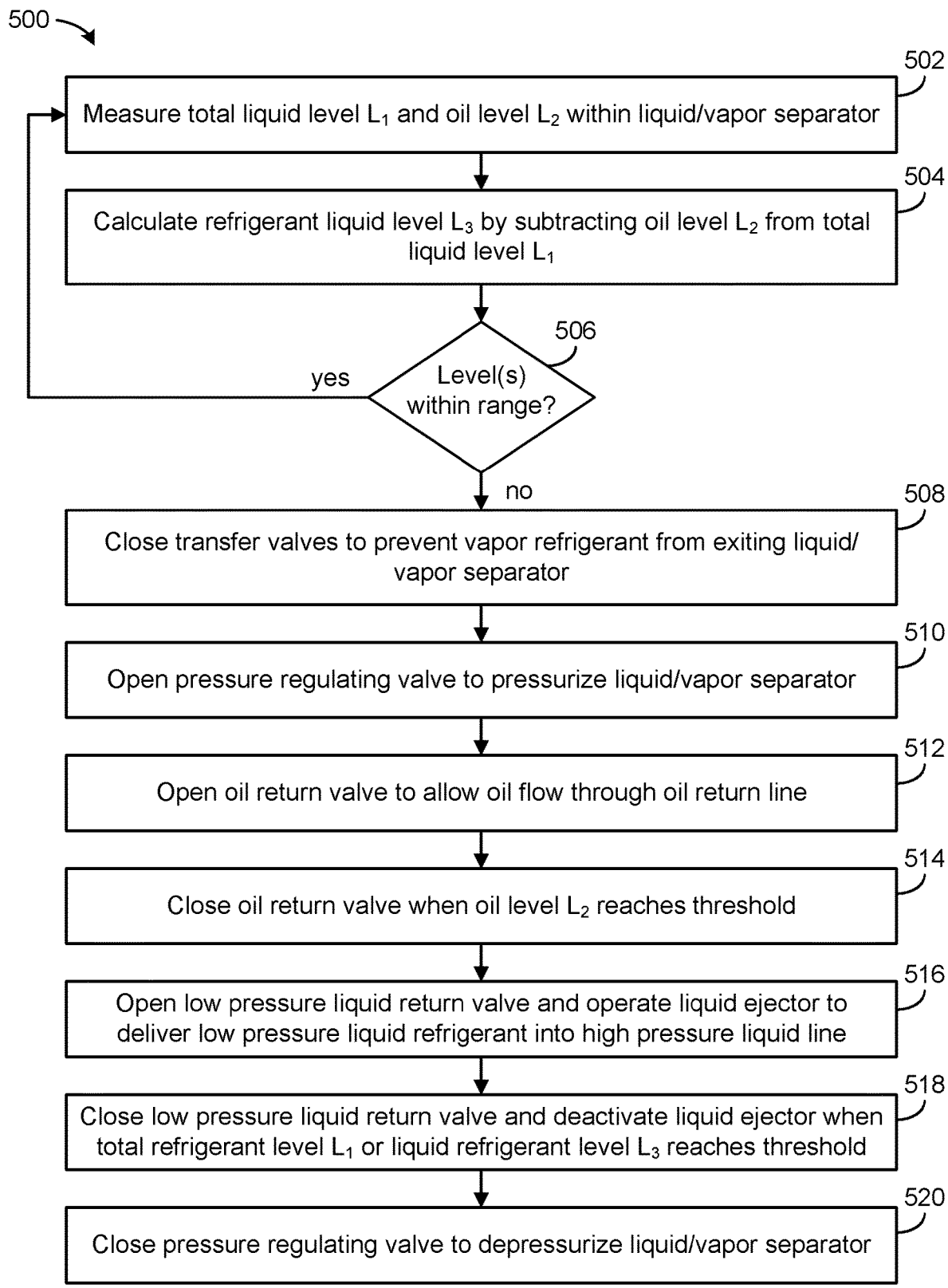
FIG. 10 is a flowchart of another process which can be performed by the controller of the refrigeration system of FIG. 1A to return liquid refrigerant to the evaporator of the refrigeration system and return oil to the compressor of the refrigeration system, according to some embodiments.

Referring now to FIG. 10, a flowchart of a process 500 performed by controller 154 to return liquid refrigerant from liquid/vapor separator 118 to evaporator 74 and/or return oil from liquid/vapor separator 118 to compressor 12 is shown, according to an exemplary embodiment. Process 500 may be performed by controller 154 by operating various components of refrigeration system 10, as shown in FIG. 3. Process 500 is shown to include measuring the total liquid level $L_1$ and oil level $L_2$ within liquid/vapor separator 118 (step 502). Step 502 may be performed using the measurements from sensors 112-114. Controller 154 may subtract the oil level $L_2$ from the total liquid level $L_1$ to calculate the level of liquid refrigerant $L_3$ within liquid/vapor separator 118 (i.e., $L_3=L_1-L_2$) (step 504).

Controller 154 may compare any of the liquid levels $L_1$, $L_2$, and/or $L_3$ to one or more threshold limits to determine whether any of the liquid levels $L_1$, $L_2$, and/or $L_3$ are within threshold limits (e.g., below a minimum level threshold, above a maximum level threshold, outside a threshold range, etc.) (step 506). If all of the liquid levels $L_1$, $L_2$, and/or $L_3$ are within threshold limits, controller 154 may end process 500 or return to step 502 without returning any liquid refrigerant or oil. If one or more of the liquid levels $L_1$, $L_2$, and/or $L_3$ is not within threshold limits, controller 154 may proceed to closing transfer valves 102 and 104 to prevent vapor refrigerant from exiting liquid/vapor separator 118 via separator outlet 119 (step 508). Controller 154 may open pressure regulating valve 130 to connect liquid/vapor separator 118 to the high pressure source (e.g., discharge line 14), thereby pressurizing liquid/vapor separator 118 (step 510). Because transfer valves 102 and 104 are closed, the increased pressure does not force vapor refrigerant out of liquid/vapor separator 118.

To return oil to compressor 12, controller 154 may open oil return valve 126 to allow the oil to flow through oil return line 124 (step 512). The increased pressure within liquid/vapor separator 118 causes the oil at the bottom of liquid/vapor separator 118 to flow out of liquid/vapor separator 118, into oil return line 124, through oil return check valve 160, and into suction line 90. The oil may mix with vapor refrigerant in suction line 90 and disperse within the vapor refrigerant. The mixture of oil and vapor refrigerant may then be fed into compressor 12 via suction line to return the oil to compressor 12. While the oil is flowing through oil return line 124, controller 154 may monitor the oil level $L_2$ and close oil return valve 126 in response to the oil level $L_2$ reaching a threshold (step 514). The threshold used in step 514 may be the same threshold used in step 506 or a different threshold, greater than or less than the threshold used in step 506.

To return liquid refrigerant to evaporator 74, controller 154 may open low pressure liquid return valve 138 and operate liquid ejector 170 to deliver the low pressure liquid refrigerant from low pressure liquid return line 136 into high pressure liquid line 68 (step 516). The increased pressure within liquid/vapor separator 118 and the action of liquid ejector 170 causes the liquid refrigerant within liquid/vapor separator 118 to flow out of liquid/vapor separator 118, into low pressure liquid return line 136, and into high pressure liquid line 68 via liquid injector 170. While the liquid refrigerant is flowing through low pressure liquid return line 136, controller 154 may monitor the total liquid level $L_1$ and/or the liquid refrigerant level $L_3$ (which can be recalculated based on updated measurements from sensors 112-114) and may close low pressure liquid return valve 138 and deactivate liquid refrigerant pump 168 in response to the total liquid level $L_1$ and/or the liquid refrigerant level $L_3$ reaching a threshold (step 518). The threshold used in step 518 may be the same threshold used in step 506 or a different threshold, greater than or less than the threshold used in step 506.

In some embodiments, controller 154 may return oil to compressor 12 without returning liquid refrigerant to evaporator 74 by omitting steps 516-518 from process 500. Similarly, controller 154 may return liquid refrigerant to evaporator 74 without returning oil to compressor 12 by omitting steps 512-514 from process 500. In some embodiments, controller 154 automatically determines whether to omit any of steps 512-518 from process 500 based on the measurements from sensors 112-114. For example, if the oil level $L_2$ is within threshold limits but the liquid refrigerant level $L_3$ is not within threshold limits, controller 154 may automatically omit steps 512-514 from process 500. Similarly, if the liquid refrigerant level $L_3$ is within threshold limits but the oil level $L_2$ is not within threshold limits, controller 154 may automatically omit steps 516-518 from process 500. Upon completing the oil return process (steps 512-514) and/or the liquid refrigerant return process (steps 516-518) controller 154 may open pressure regulating valve 130 to depressurize liquid/vapor separator 118 (step 520). Advantageously, executing process 500 to return low pressure liquid refrigerant to evaporator 74 may increase the efficiency of refrigeration system 10 by 10%-20%.

Evaporator Electric Defrost

Figure 11:
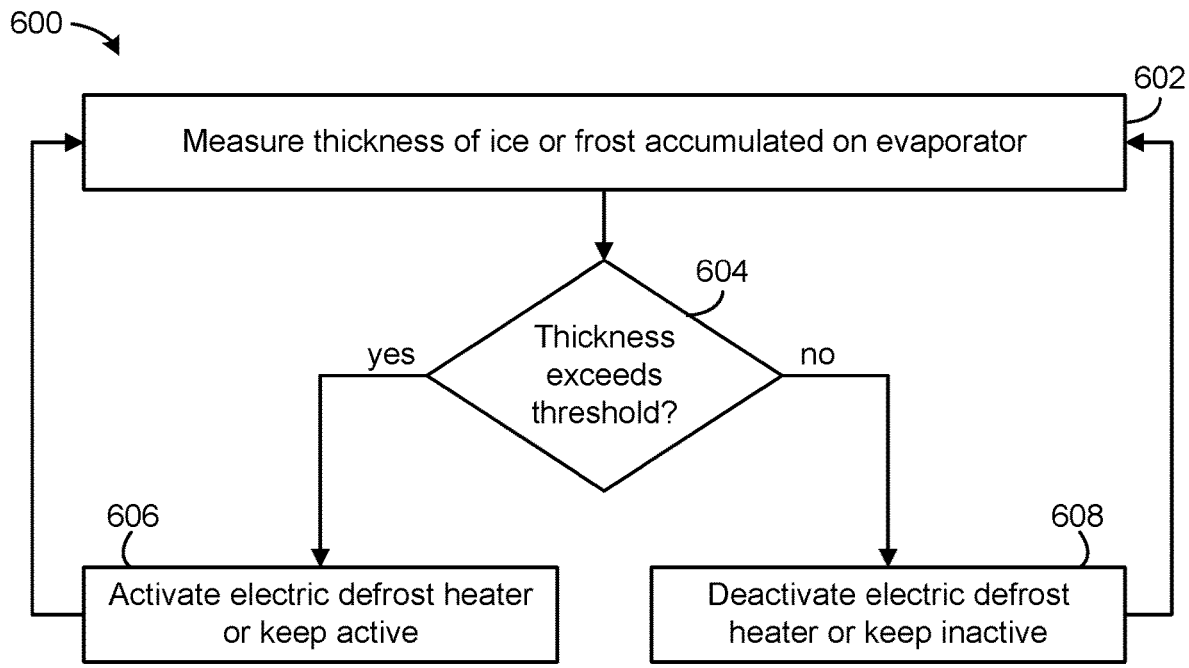
FIG. 11 is a flowchart of another process which can be performed by the controller of the refrigeration system of FIG. 1A to defrost the evaporator using an electric defrost heater, according to some embodiments.

Referring now to FIG. 11, a flowchart of an electric defrost process 600 is shown, according to an exemplary embodiment. Process 600 may be performed by controller 154 to remove accumulated ice or frost from evaporator 74. Process 600 may be executed using any of the embodiments of refrigeration system 10 described herein. Ice sensor 166 may be used to measure the thickness of ice or frost accumulated on evaporator 74 (step 602). The measurements obtained by ice sensor 166 may be provided to controller 154. Controller 154 may compare the measured ice thickness to a threshold thickness level to determine whether the measured ice thickness exceeds the threshold (step 604). In some embodiments, the threshold is approximately zero or a value that corresponds to no ice or frost accumulated on evaporator 74.

If the measured ice thickness exceeds the threshold (i.e., the result of step 604 is "yes"), controller 154 may activate electric defrost heater 164 if electric defrost heater 164 is currently inactive or keep electric defrost heater 164 active if electric defrost heater 164 is currently active (step 606). However, if the measured ice thickness does not exceed the threshold (i.e., the result of step 604 is "no"), controller 154 may deactivate electric defrost heater 164 if electric defrost heater 164 is currently active or keep electric defrost heater 164 inactive if electric defrost heater 164 is currently inactive (step 608). Process 600 may return to step 602 after performing either of steps 606 or 608 and may be repeated during operation of refrigeration system 10. In some embodiments, process 600 is continuously running while refrigeration system 10 is active. In other embodiments, process 600 may be executed periodically (e.g., hourly, daily, weekly, etc.), intermittently, or on demand from a user.

Evaporator Hot Gas Defrost

Figure 4:
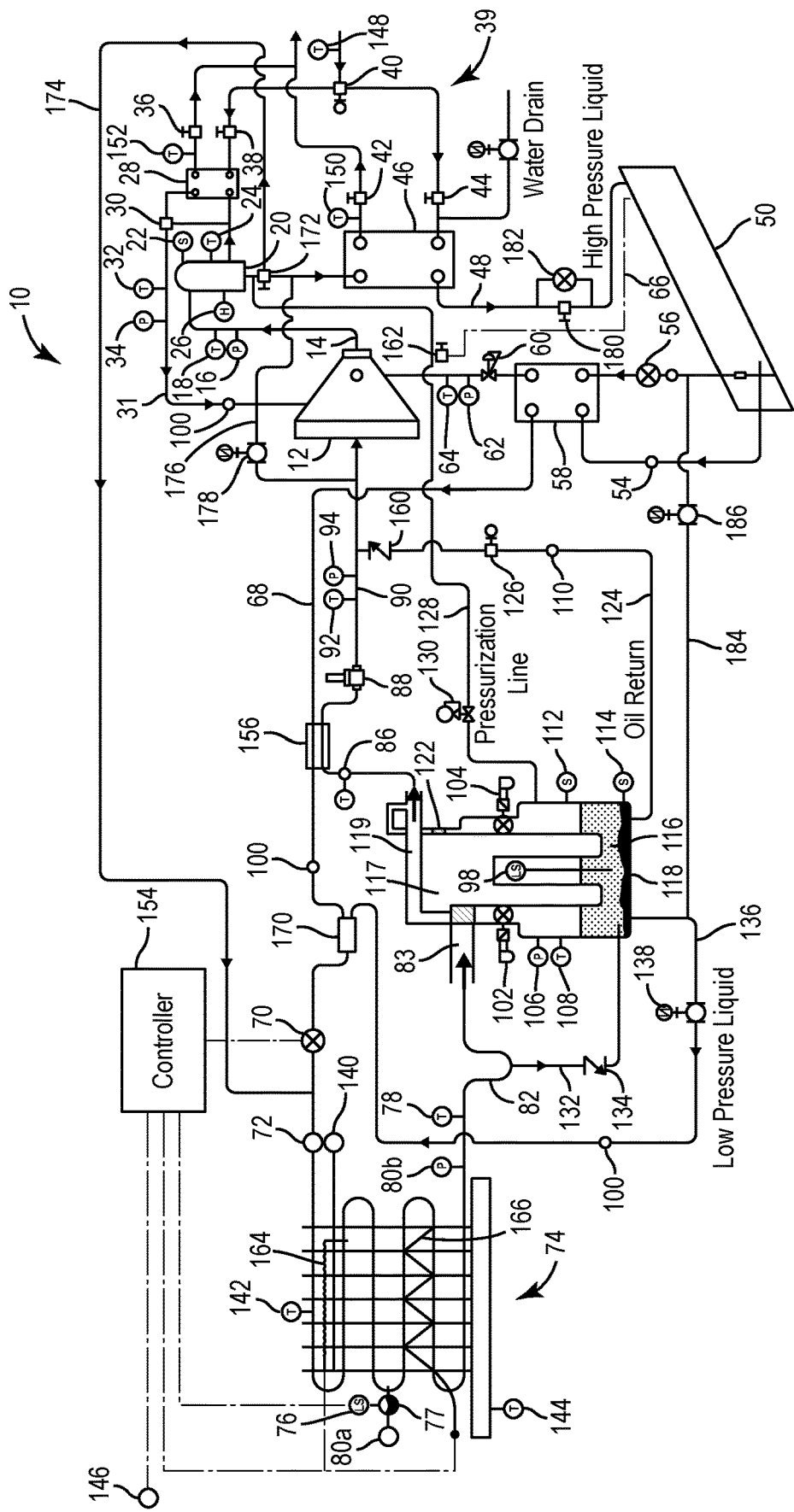
FIG. 4 is another block diagram of the refrigeration system of FIG. 1A including hot gas defrost equipment, according to some embodiments.

Referring now to FIG. 4, another embodiment of refrigeration system 10 is shown in which a hot gas defrost line 174 fluidly couples a hot gas source to evaporator 74. In some embodiments, the hot gas source is compressor discharge line 14. For example, one end of hot gas defrost line 174 may be connected to discharge line 14 upstream of oil separator 20 (e.g., between compressor 14 and oil separator 20) or downstream of oil separator 20 (e.g., between oil separator 20 and condenser 46). The other end of hot gas defrost line 174 may be connected to the inlet of evaporator 74 (e.g., between expansion valve 70 and evaporator 74). Hot gas defrost line 174 may be configured to deliver the hot compressed gas refrigerant from discharge line 14 to evaporator 74 to defrost evaporator 74.

A discharge gas bypass valve 172 may be located along hot gas defrost line 174 and can be operated by controller 154 to control the flow of hot gas refrigerant to evaporator 74. In some embodiments, discharge gas bypass valve 172 is located at the intersection of discharge line 14 and hot gas defrost line 174, as shown in FIG. 4. Discharge gas bypass valve 172 can be moved between a first position in which the hot gas refrigerant from discharge line 14 is routed to condenser 46 and a second position in which the hot gas refrigerant from discharge line 14 is routed to evaporator 74 via hot gas defrost line 174. During normal operation of refrigeration system 10, controller 154 may command discharge gas bypass valve 172 to remain in the first position to deliver the hot gas refrigerant from discharge line 14 to condenser 46. During the hot gas defrost operation, controller 154 may command discharge gas bypass valve 172 to move into the second position to route the hot gas refrigerant from discharge line 14 to evaporator 74 via hot gas defrost line 174.

In some embodiments, refrigeration system 10 includes hot gas defrost return line 176 fluidly coupling discharge line 14 to suction line 90. One end of hot gas defrost return line 176 may be connected to discharge line 14 upstream of oil separator 20 (e.g., between compressor 14 and oil separator 20) or downstream of oil separator 20 (e.g., between oil separator 20 and condenser 46) at a location between discharge gas bypass valve 172 and condenser 46. The other end of hot gas defrost return line 176 may be connected to suction line 90. A hot gas defrost return valve 178 may be positioned along hot gas defrost return line 176 and can be operated by controller 154 to control the flow of refrigerant through hot gas defrost return line 176. During normal operation of refrigeration system 10, controller 154 may command hot gas defrost return valve 178 to remain in a closed position to prevent the hot gas refrigerant from discharge line 14 from flowing to suction line 90. During the hot gas defrost operation, the refrigerant may flow in a reverse direction through condenser 46 (opposite the direction shown in FIG. 4) and controller 154 may command hot gas defrost return valve 178 to move into an open position to route the refrigerant exiting condenser 46 to suction line 90.

In some embodiments, refrigeration system 10 includes a liquid stop valve 180 located along condenser liquid drop leg 48 and an expansion valve 182 arranged in parallel with liquid stop valve 180 along condenser liquid drop leg 48. During normal operation of refrigeration system 10, controller 154 may command liquid stop valve 180 to remain fully open to allow flow of the refrigerant from condenser 46 to liquid collector 50 via condenser liquid drop leg 48 and may command expansion valve 182 to remain fully closed. During the hot gas defrost operation, the refrigerant may flow in a reverse direction through condenser liquid drop leg 48 (opposite the direction shown in FIG. 4) and controller 154 may command liquid stop valve 180 to remain fully closed. Controller may operate expansion valve 182 to expand the liquid refrigerant flowing in the reverse direction through condenser liquid drop leg 48 such that the refrigerant is expanded and cooled before entering condenser 46. Accordingly, condenser 46 may operate as an evaporator during the hot gas defrost operation.

In some embodiments, refrigeration system 10 includes a hot gas defrost bypass line 184 fluidly coupling liquid collector 50 to low pressure liquid return line 136. A stop valve 186 may be located along hot gas defrost bypass line 184 and can be operated by controller 154 to control the flow of liquid refrigerant through hot gas defrost bypass line 184. During normal operation of refrigeration system 10, controller 154 may command stop valve 186 to remain fully closed to prevent flow of the liquid refrigerant through hot gas defrost bypass line 184. During the hot gas defrost operation, controller 154 may command stop valve 186 to move into an open position to allow the liquid refrigerant to flow from low pressure liquid return line 136 into liquid collector 50. The other components shown in FIG. 4 may be the same as or similar to the like-numbered components shown in FIGS. 1A-3 and may function in the same manner as described with reference to FIGS. 1A-3.

During normal operation of refrigeration system 10, the hot gas refrigerant from discharge line 14 may be routed to condenser 46 where the refrigerant rejects heat and then into liquid collector 50 via condenser liquid drop leg 48. The refrigerant may then exit liquid collector 50, pass through economizer heat exchanger 58, and to expansion valve 70 via high pressure liquid line 68. Expansion valve 70 may expand the refrigerant to a low temperature, low pressure state and the expanded refrigerant may flow into evaporator 74 where the refrigerant absorbs heat and then into liquid/vapor separator 118. Vapor refrigerant from liquid/vapor separator 118 may be routed to suction line 90 and into compressor 12, where the refrigerant is compressed and discharged back into discharge line 14.

During the hot gas defrost operation, the hot gas refrigerant from discharge line 14 may be routed to evaporator 74 via hot gas defrost line 174 and may reject heat within evaporator 74 to defrost any accumulated ice or frost on evaporator 74. The refrigerant from evaporator 74 may then be routed into liquid/vapor separator 118 and may exit liquid/vapor separator 118 via low pressure liquid return line 136. Low pressure liquid return valve 138 may be closed and stop valve 186 may be open, causing the refrigerant to flow into liquid collector 50 via hot gas defrost bypass line 184. Expansion valve 56 may be opened and a portion of the liquid refrigerant may be expanded through expansion valve 56 and economizer heat exchanger 58. Another portion of the refrigerant may flow in a reverse direction through condenser liquid drop leg 48 and through expansion valve 182 which expands the refrigerant to a lower pressure, lower temperature state. The expanded refrigerant may be delivered into condenser 46 which operates as an evaporator during the hot gas defrost operation to transfer heat into the refrigerant within condenser 46. The refrigerant exiting condenser 46 may flow into discharge line 14 (on one side of discharge gas bypass valve 172 which is closed during the defrost operation), through hot gas defrost return line 176, and into compressor 12 via suction line 90. Compressor 12 may compress the refrigerant and discharge the refrigerant back into discharge line 14 (on the opposite side of discharge gas bypass valve 172).

Figure 12:
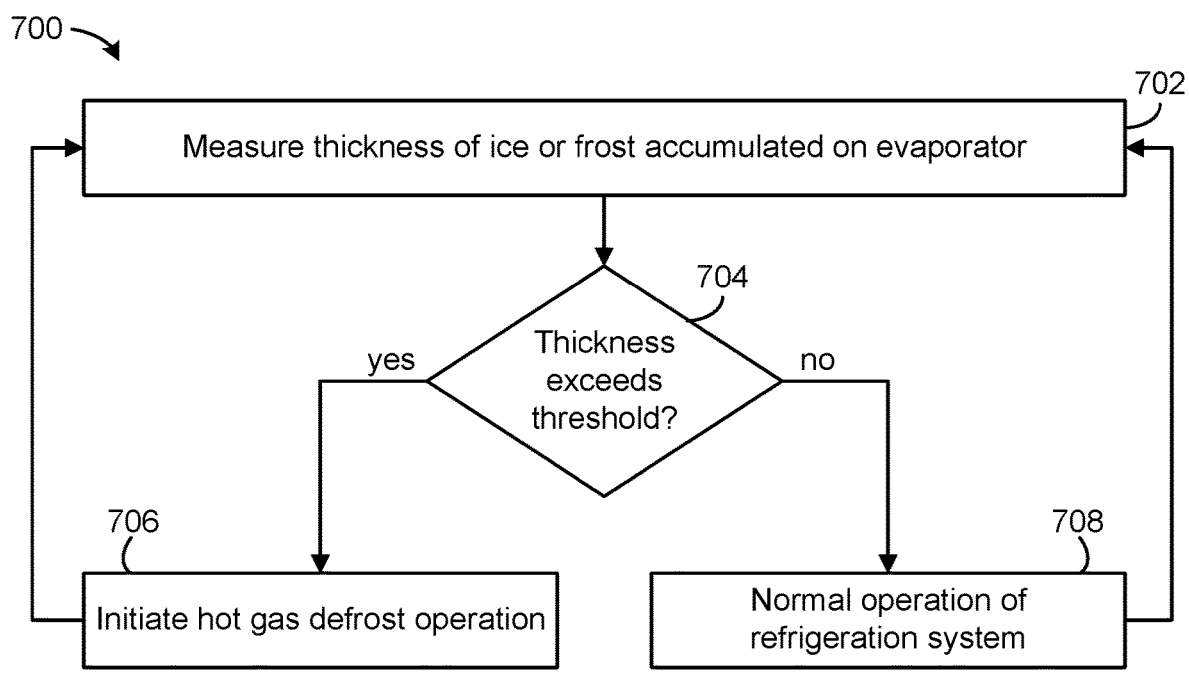
FIG. 12 is a flowchart of another process which can be performed by the controller of the refrigeration system of FIG. 1A to defrost the evaporator using a hot gas defrost process, according to some embodiments.

Referring now to FIG. 12, a flowchart of a hot gas defrost process 700 is shown, according to an exemplary embodiment. Process 700 may be performed by controller 154 to remove accumulated ice or frost from evaporator 74. Process 700 may be executed using any of the embodiments of refrigeration system 10 described herein. Ice sensor 166 may be used to measure the thickness of ice or frost accumulated on evaporator 74 (step 702). The measurements obtained by ice sensor 166 may be provided to controller 154. Controller 154 may compare the measured ice thickness to a threshold thickness level to determine whether the measured ice thickness exceeds the threshold (step 704). In some embodiments, the threshold is approximately zero or a value that corresponds to no ice or frost accumulated on evaporator 74.

If the measured ice thickness exceeds the threshold (i.e., the result of step 704 is "yes"), controller 154 may initiate a hot gas defrost operation (step 706). The hot gas defrost operation may include operating compressor 12 to perform a pump down operation, closing expansion valve 70, and closing suction flow modulation valve 88. Discharge gas bypass valve 172 may be operated to divert the hot gas refrigerant from discharge line 14 into evaporator 74 via hot gas defrost line 174. The hot gas may release heat within evaporator 74, partially condense, and the liquid/vapor refrigerant may flow from evaporator 74 to liquid/vapor separator 118. Stop valve 186 and expansion valve 182 may be opened and liquid stop valve 180 may be closed. The liquid refrigerant from liquid/vapor separator 118 flows through liquid collector 50. Expansion valve 56 may be opened and a portion of the liquid refrigerant may be expanded through expansion valve 56 and economizer heat exchanger 58. Another portion of the refrigerant may flow in a reverse direction through condenser liquid drop leg 48 and through expansion valve 182 which expands the refrigerant to a lower pressure, lower temperature state. The refrigerant absorbs heat in condenser 46 and is returned to suction line 90 via hot gas defrost return line 176. Hot gas defrost return valve 178 may be opened to route the refrigerant through hot gas defrost return line 176.

If the measured ice thickness does not exceed the threshold (i.e., the result of step 704 is "no"), controller 154 may continue normal operation of refrigeration system 10 (step 708). During normal operation of refrigeration system 10, the hot gas refrigerant from discharge line 14 may be routed to condenser 46 where the refrigerant rejects heat and then into liquid collector 50 via condenser liquid drop leg 48. The refrigerant may then exit liquid collector 50, pass through economizer heat exchanger 58, and to expansion valve 70 via high pressure liquid line 68. Expansion valve 70 may expand the refrigerant to a low temperature, low pressure state and the expanded refrigerant may flow into evaporator 74 where the refrigerant absorbs heat and then into liquid/vapor separator 118. Vapor refrigerant from liquid/vapor separator 118 may be routed to suction line 90 and into compressor 12, where the refrigerant is compressed and discharged back into discharge line 14.

Process 700 may return to step 702 after performing either of steps 706 or 708 and may be repeated during operation of refrigeration system 10. In some embodiments, process 700 is continuously running while refrigeration system 10 is active. In other embodiments, process 700 may be executed periodically (e.g., hourly, daily, weekly, etc.), intermittently, or on demand from a user.

Four-Way Valve Reverse Flow Defrost

Figure 5A:
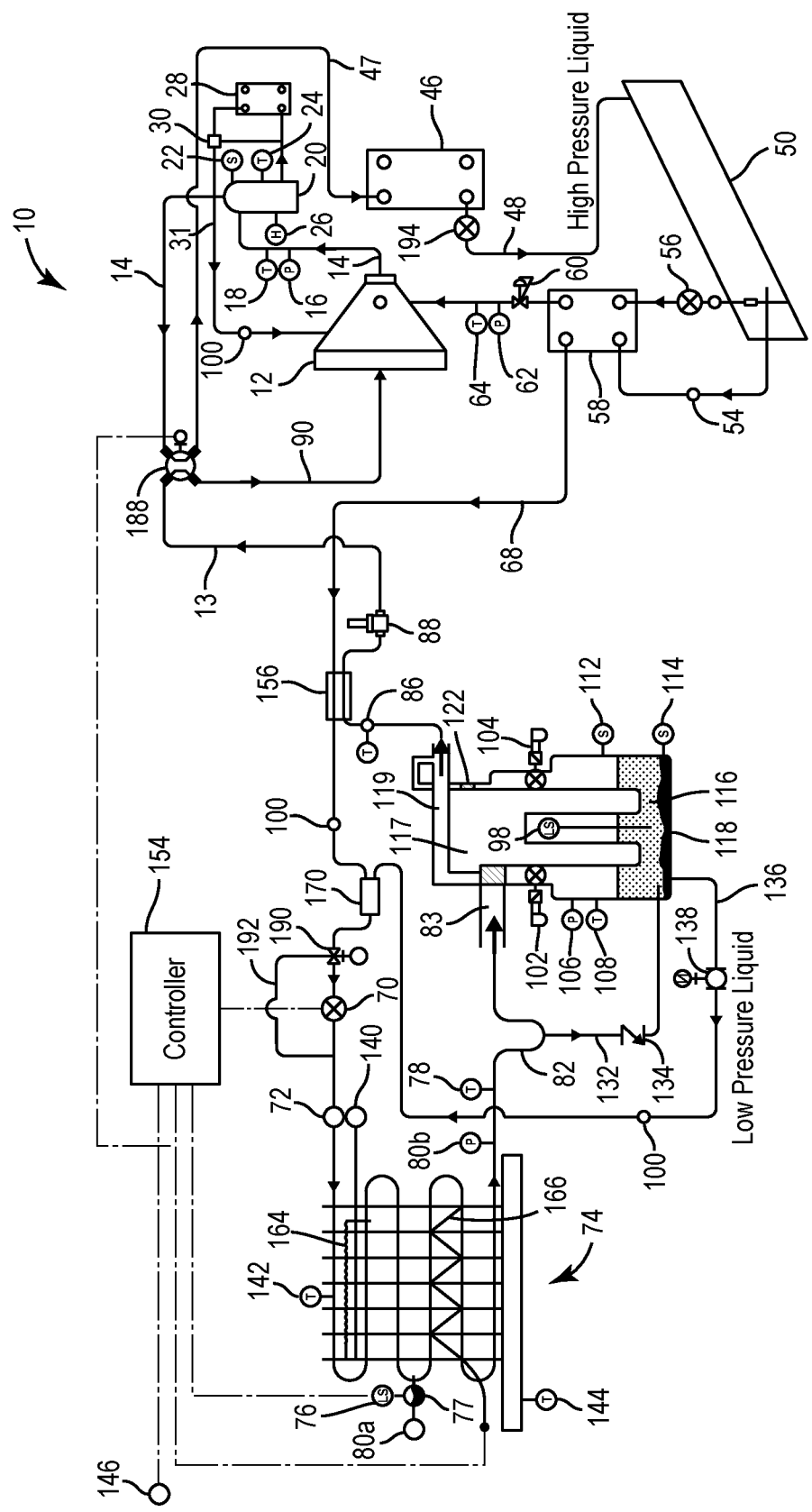
FIG. 5A is another block diagram of the refrigeration system of FIG. 1A including a four-way valve to switch between a hot gas defrost process and normal operation, showing the flow of refrigerant during normal operation, according to some embodiments.
Figure 5B:
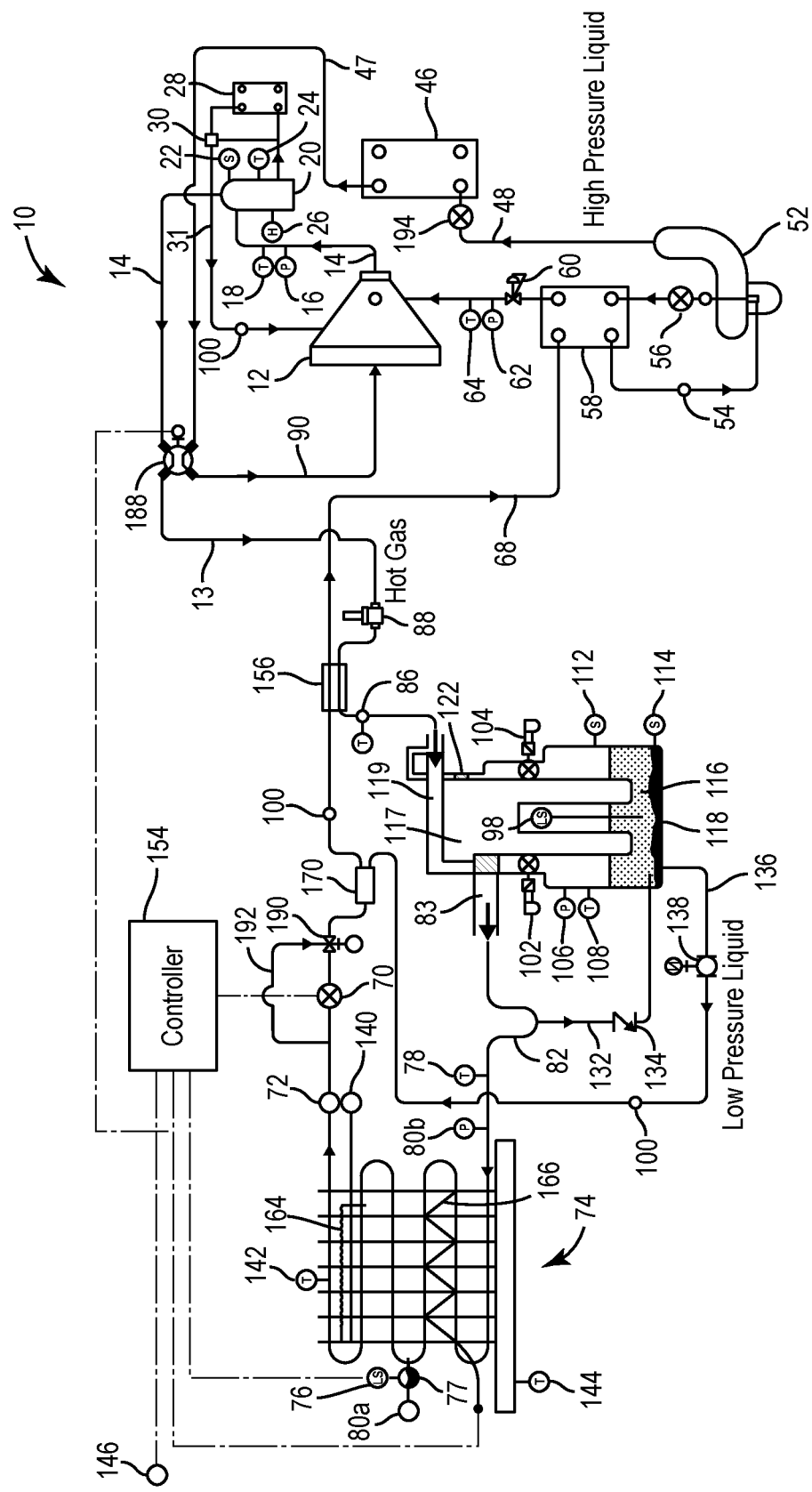
FIG. 5B is another block diagram of the refrigeration system of FIG. 1A including a four-way valve to switch between a hot gas defrost process and normal operation, showing the flow of refrigerant during the hot gas defrost process, according to some embodiments.

Referring now to FIGS. 5A-5B, another embodiment of refrigeration system 10 is shown in which a four-way valve 188 is used to switch between normal operation of refrigeration system 10 and a hot gas defrost operation. FIG. 5A shows the position of four-way valve 188 and the resulting flow of refrigerant through refrigeration system 10 during normal operation of refrigeration system 10, whereas FIG. 5B shows the position of four-way valve 188 and the resulting flow of refrigerant through refrigeration system 10 during the hot gas defrost operation. Many of the components shown in FIGS. 5A-5B may be the same as or similar to the like-numbered components shown in FIGS. 1A-4 and may function in the same manner as described with reference to FIGS. 1A-4. The new components shown in FIGS. 5A-5B are described below.

Referring particularly to FIG. 5A, during normal operation of refrigeration system 10, four-way valve 188 is maintained in a first position that fluidly connects compressor discharge line 14 with condenser line 47 and fluidly connects suction line 90 with separator line 13. Accordingly, the hot gas refrigerant from discharge line 14 is routed into condenser line 47 by four-way valve 188 and flows into condenser 46. The refrigerant at least partially condenses within condenser 46 and flows into liquid collector 50 and through economizer heat exchanger 58 in the direction shown in FIG. 5A. Expansion valve 194 may be fully open or bypassed such that the refrigerant is not expanded by expansion valve 194 during normal operation of refrigeration system 10. The refrigerant from economizer heat exchanger 58 flows through high pressure liquid line 68 and is routed to expansion valve 70 by three-way valve 190. Hot gas defrost bypass line 192 may be closed by three-way valve 190 such that none of the refrigerant flows through hot gas defrost bypass line 192 during normal operation of refrigeration system 10. Expansion valve 70 expands the refrigerant to a low temperature, low pressure state and the expanded refrigerant is delivered into evaporator 74, in which the refrigerant absorbs heat. The refrigerant flows from evaporator 74 into liquid/vapor separator 118. Vapor refrigerant from liquid/vapor separator 118 is discharged into separator line 13. Four-way valve 188 routes the refrigerant from separator line 13 into suction line 90 and into compressor 12. Compressor 12 compresses the refrigerant and discharges it into discharge line 14.

Referring particularly to FIG. 5B, during the hot gas defrost operation, four-way valve 188 is maintained in a second position that fluidly connects compressor discharge line 14 with separator line 13 and fluidly connects suction line 90 with condenser line 47. Accordingly, the hot gas refrigerant from discharge line 14 is routed into separator line 13 by four-way valve 188 and flows into liquid/vapor separator 118. Vapor refrigerant exits liquid/vapor separator 118 via trap 82 or suction gravity drain 84 (shown in FIG. 1B) for embodiments in which trap 82 is replaced with suction gravity drain 84. The vapor refrigerant then flows into evaporator 74 in the direction shown in FIG. 5B and rejects heat within evaporator 74 to defrost any accumulated ice or frost. Three-way valve 190 is maintained in a position that causes the refrigerant exiting evaporator 74 to flow through hot gas defrost bypass line 192, bypassing expansion valve 70, and into high pressure liquid line 68. The liquid refrigerant is collected in liquid collector 52 and is delivered to expansion valve 194 via condenser liquid drop leg 48. Expansion valve 194 expands the refrigerant to a low temperature, low pressure state and the expanded refrigerant is delivered into condenser 46 (acting as an evaporator), in which the refrigerant absorbs heat. The refrigerant flows from condenser 46 into condenser line 47. Four-way valve 188 routes the refrigerant from condenser line 47 into suction line 90 and into compressor 12. Compressor 12 compresses the refrigerant and discharges it into discharge line 14.

Figure 13:
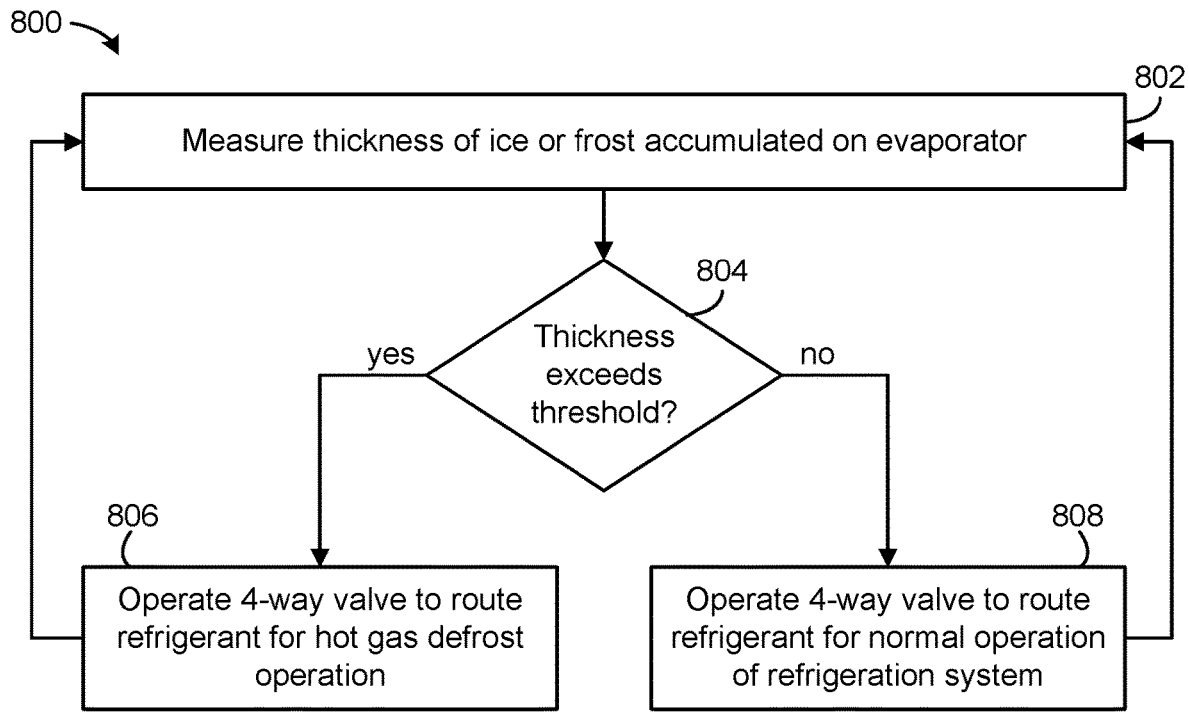
FIG. 13 is a flowchart of another process which can be performed by the controller of the refrigeration system of FIG. 1A to defrost the evaporator using a hot gas defrost process and a four-way valve, according to some embodiments.

Referring now to FIG. 13, a flowchart of a hot gas defrost process 800 is shown, according to an exemplary embodiment. Process 800 may be performed by controller 154 to remove accumulated ice or frost from evaporator 74. Process 800 may be executed using the embodiment of refrigeration system 10 shown in FIGS. 5A-5B. Ice sensor 166 may be used to measure the thickness of ice or frost accumulated on evaporator 74 (step 802). The measurements obtained by ice sensor 166 may be provided to controller 154. Controller 154 may compare the measured ice thickness to a threshold thickness level to determine whether the measured ice thickness exceeds the threshold (step 804). In some embodiments, the threshold is approximately zero or a value that corresponds to no ice or frost accumulated on evaporator 74.

If the measured ice thickness exceeds the threshold (i.e., the result of step 804 is "yes"), controller 154 may initiate a hot gas defrost operation (step 806). The hot gas defrost operation may include operating compressor 12 to perform a pump down operation and moving four-way valve 188 into a position that fluidly connects compressor discharge line 14 with separator line 13 and fluidly connects suction line 90 with condenser line 47. Accordingly, the hot gas refrigerant from discharge line 14 is routed into separator line 13 by four-way valve 188 and flows into liquid/vapor separator 118. Vapor refrigerant exits liquid/vapor separator 118 via trap 82 or suction gravity drain 84 (shown in FIG. 1B) for embodiments in which trap 82 is replaced with suction gravity drain 84. The vapor refrigerant then flows into evaporator 74 in the direction shown in FIG. 5B and rejects heat within evaporator 74 to defrost any accumulated ice or frost. Three-way valve 190 is maintained in a position that causes the refrigerant exiting evaporator 74 to flow through hot gas defrost bypass line 192, bypassing expansion valve 70, and into high pressure liquid line 68. The liquid refrigerant is collected in liquid collector 52 and is delivered to expansion valve 194 via condenser liquid drop leg 48. Expansion valve 194 expands the refrigerant to a low temperature, low pressure state and the expanded refrigerant is delivered into condenser 46 (acting as an evaporator), in which the refrigerant absorbs heat. The refrigerant flows from condenser 46 into condenser line 47. Four-way valve 188 routes the refrigerant from condenser line 47 into suction line 90 and into compressor 12. Compressor 12 compresses the refrigerant and discharges it into discharge line 14.

If the measured ice thickness does not exceed the threshold (i.e., the result of step 804 is "no"), controller 154 may continue normal operation of refrigeration system 10 (step 808). Step 808 may include moving four-way valve 188 into a position that fluidly connects compressor discharge line 14 with condenser line 47 and fluidly connects suction line 90 with separator line 13. Accordingly, the hot gas refrigerant from discharge line 14 is routed into condenser line 47 by four-way valve 188 and flows into condenser 46. The refrigerant at least partially condenses within condenser 46 and flows into liquid collector 50 and through economizer heat exchanger 58 in the direction shown in FIG. 5A. Expansion valve 194 may be fully open or bypassed such that the refrigerant is not expanded by expansion valve 194 during normal operation of refrigeration system 10. The refrigerant from economizer heat exchanger 58 flows through high pressure liquid line 68 and is routed to expansion valve 70 by three-way valve 190. Hot gas defrost bypass line 192 may be closed by three-way valve 190 such that none of the refrigerant flows through hot gas defrost bypass line 192 during normal operation of refrigeration system 10. Expansion valve 70 expands the refrigerant to a low temperature, low pressure state and the expanded refrigerant is delivered into evaporator 74, in which the refrigerant absorbs heat. The refrigerant flows from evaporator 74 into liquid/vapor separator 118. Vapor refrigerant from liquid/vapor separator 118 is discharged into separator line 13. Four-way valve 188 routes the refrigerant from separator line 13 into suction line 90 and into compressor 12. Compressor 12 compresses the refrigerant and discharges it into discharge line 14.

Process 800 may return to step 802 after performing either of steps 806 or 808 and may be repeated during operation of refrigeration system 10. In some embodiments, process 800 is continuously running while refrigeration system 10 is active. In other embodiments, process 800 may be executed periodically (e.g., hourly, daily, weekly, etc.), intermittently, or on demand from a user.

Evaporator Water Defrost

Figure 6:
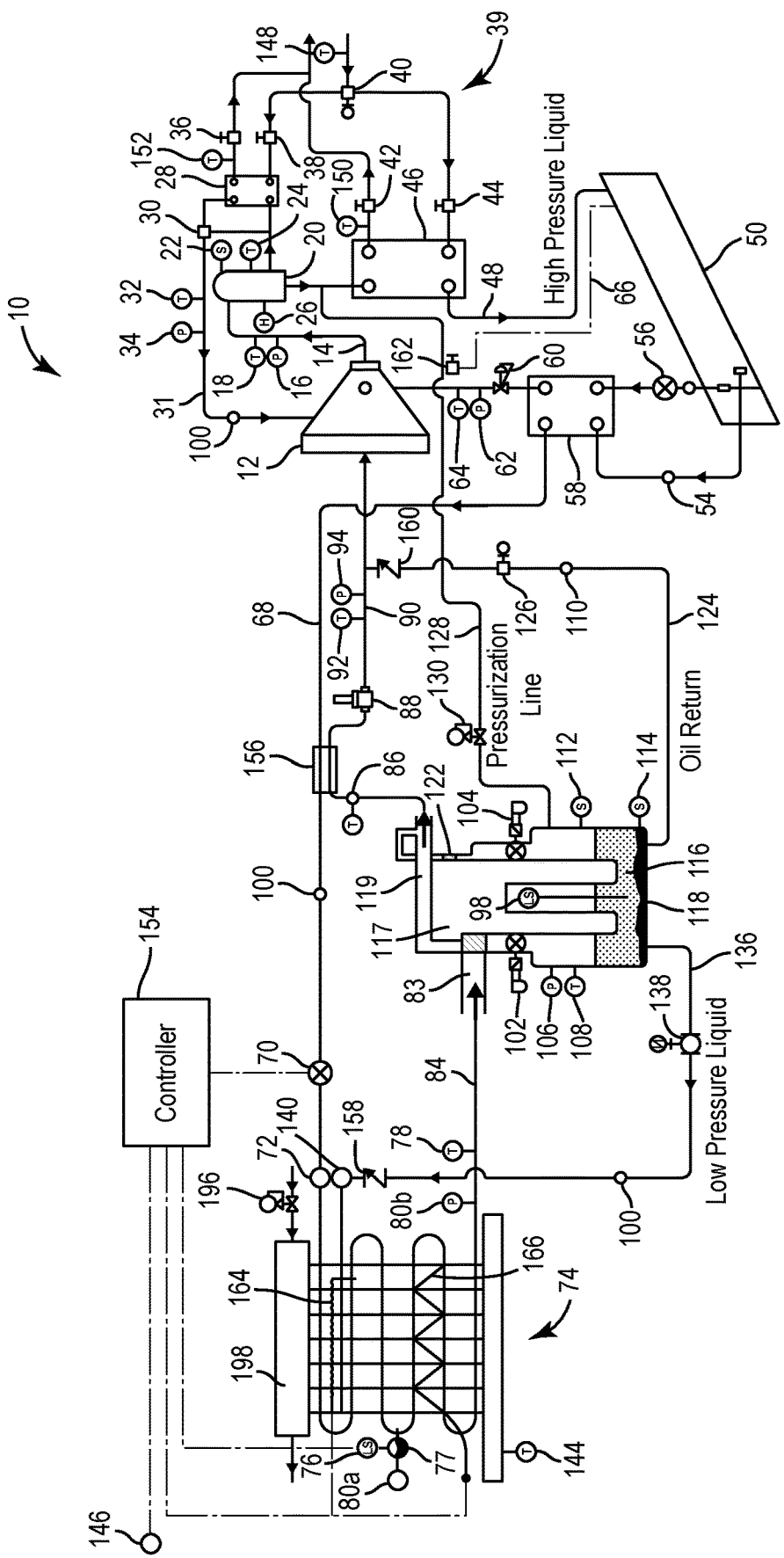
FIG. 6 is another block diagram of the refrigeration system of FIG. 1A including water defrost equipment, according to some embodiments.

Referring now to FIG. 6, another embodiment of refrigeration system 10 is shown in which water or another defrost fluid is used to defrost evaporator 74. Refrigeration system 10 is shown to include a water control valve 196 which can be operated by controller 154 to control the flow of water or another defrost fluid into a header 198 which distributes the water or defrost fluid over evaporator 74. When water control valve 196 is open, the heat provided by the water or other defrost fluid melts any ice or frost accumulated on evaporator 74. When water control valve 196 is closed, the flow of water or other defrost fluid through evaporator 74 is prevented. The other components shown in FIG. 6 may be the same as or similar to the like-numbered components shown in FIGS. 1A-5B and may function in the same manner as described with reference to FIGS. 1A-5B.

Figure 14:
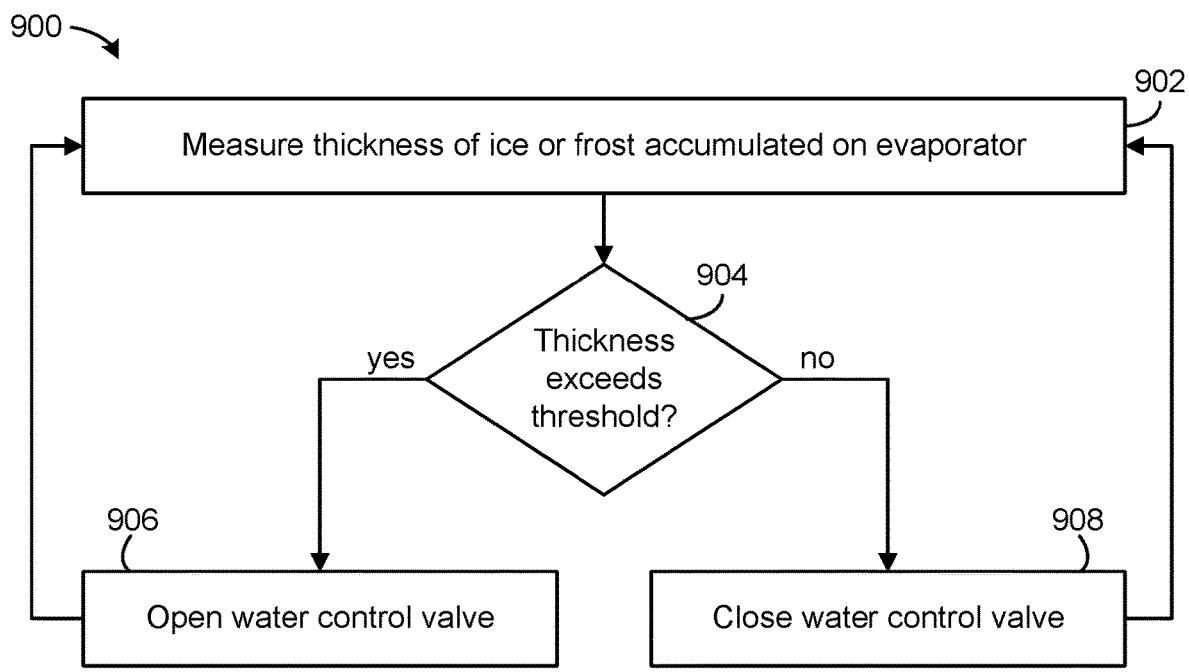
FIG. 14 is a flowchart of another process which can be performed by the controller of the refrigeration system of FIG. 1A to defrost the evaporator using a water defrost process, according to some embodiments.

Referring now to FIG. 14, a flowchart of a water defrost process 900 is shown, according to an exemplary embodiment. Process 900 may be performed by controller 154 to remove accumulated ice or frost from evaporator 74. Process 900 may be executed using the embodiment of refrigeration system 10 shown in FIG. 6. Ice sensor 166 may be used to measure the thickness of ice or frost accumulated on evaporator 74 (step 902). The measurements obtained by ice sensor 166 may be provided to controller 154. Controller 154 may compare the measured ice thickness to a threshold thickness level to determine whether the measured ice thickness exceeds the threshold (step 904). In some embodiments, the threshold is approximately zero or a value that corresponds to no ice or frost accumulated on evaporator 74.

If the measured ice thickness exceeds the threshold (i.e., the result of step 904 is "yes"), controller 154 may open water control valve 196 if water control valve 196 is currently closed or keep water control valve 196 open if water control valve 196 is currently open (step 906). However, if the measured ice thickness does not exceed the threshold (i.e., the result of step 904 is "no"), controller 154 may close water control valve 196 if water control valve 196 is currently open or keep water control valve 196 closed if water control valve 196 is currently closed (step 908). Process 900 may return to step 902 after performing either of steps 906 or 908 and may be repeated during operation of refrigeration system 10. In some embodiments, process 900 is continuously running while refrigeration system 10 is active. In other embodiments, process 900 may be executed periodically (e.g., hourly, daily, weekly, etc.), intermittently, or on demand from a user.

Liquid Refrigerant Level, Oil Level, and Superheat Control

Figure 15:
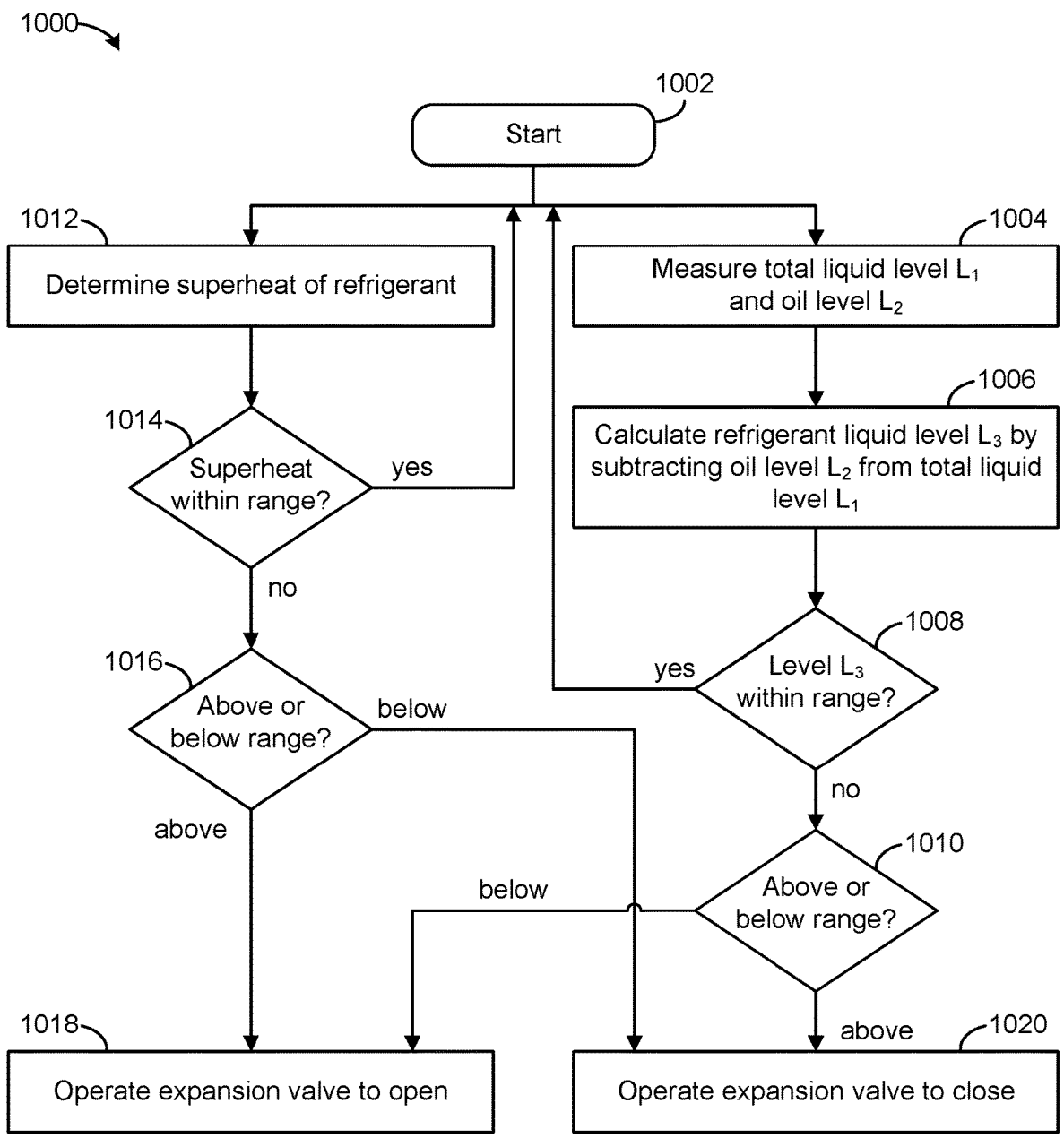
FIG. 15 is a flowchart of another process which can be performed by the controller of the refrigeration system of FIG. 1A to control the flow of refrigerant into the evaporator, according to some embodiments.

Referring now to FIG. 15, a flowchart of a process 1000 to control the flow of refrigerant into evaporator 74 is shown, according to an exemplary embodiment. Process 1000 may be performed by controller 154 in any of the embodiments of refrigeration system 10 described herein.

Upon starting process 1000 (step 1002), controller 154 may execute two parallel control strategies, shown as steps 1004-1010 and steps 1012-1018 respectively. Steps 1004-1010 can be executed by controller 154 to operate expansion valve 70 based on the level of liquid refrigerant accumulated within liquid/vapor separator 118, separator vessel 120, or liquid collection header 77. Steps 1012-1018 can be executed by controller 154 to operate expansion valve 70 based on the superheat of the refrigerant at one or more locations within refrigeration system 10.

Process 1000 is shown to include measuring the total liquid level $L_1$ and oil level $L_2$ (step 1004). In some embodiments, step 1004 is performed using the measurements from sensors 112-114 to measure the total liquid level $L_1$ and oil level $L_2$ within liquid/vapor separator 118 or separator vessel 120. In other embodiments, step 1004 is performed using measurements from sensor 76 to measure the total liquid level $L_1$ and/or the oil level $L_2$ within liquid collection header. Controller 154 may subtract the oil level $L_2$ from the total liquid level $L_1$ to calculate the level of liquid refrigerant $L_3$ (i.e., $L_3=L_1-L_2$) (step 1006). The level of liquid refrigerant $L_3$ may be related to the thermodynamic vapor quality of the refrigerant. Accordingly, the level of liquid refrigerant $L_3$ may indicate the extent to which the refrigerant has evaporated within evaporator 74 and/or the amount of heat absorbed by the refrigerant within evaporator 74. For example, a relatively higher level of liquid refrigerant $L_3$ may indicate that the refrigerant has a relatively lower vapor quality (i.e., closer to a saturated liquid) and a relatively lower superheat at the outlet of evaporator 74, whereas a relatively lower level of liquid refrigerant $L_3$ may indicate that the refrigerant has a relatively higher vapor quality (i.e., closer to a saturated vapor) and a relatively higher superheat at the outlet of evaporator 74.

Controller 154 may compare the level of liquid refrigerant $L_3$ to a setpoint range to determine whether the level of liquid refrigerant $L_3$ is within the setpoint range (e.g., below a minimum level threshold, above a maximum level threshold, outside a threshold range, etc.) (step 1008). If the liquid refrigerant level $L_3$ is within the setpoint range, controller 154 may return to start 1002 without making any adjustments to expansion valve 70. However, if the level of liquid refrigerant $L_3$ is not within the setpoint range, controller 154 may determine whether the level of liquid refrigerant $L_3$ is above or below the setpoint range (step 1010). If the level of liquid refrigerant $L_3$ is below the setpoint range, controller 154 may operate expansion valve 70 to open more (i.e., move expansion valve 70 toward an open position) (step 1018). Opening expansion valve 70 more may allow more refrigerant to flow into evaporator 74, causing the level of liquid refrigerant $L_3$ to increase toward the setpoint range. Conversely, if the level of liquid refrigerant $L_3$ is above the setpoint range, controller 154 may close expansion valve 70 more (i.e., move expansion valve 70 toward a closed position) (step 1020). Closing expansion valve 70 more may decrease the flow of refrigerant into evaporator 74, causing the level of liquid refrigerant $L_3$ to decrease toward the setpoint range.

Process 1000 is shown to include determining a superheat of the refrigerant (step 1012). In some embodiments, the superheat of the refrigerant (i.e., difference between the actual temperature of the refrigerant and the saturation temperature) is determined at the outlet of evaporator 74 using temperature and pressure measurements from temperature sensor 78 and pressure sensor 80b, respectively. In other embodiments, the superheat of the refrigerant is determined at the inlet of compressor 12 (e.g., at suction line 90) using temperature and pressure measurements from temperature sensor 92 and pressure sensor 94, respectively. In other embodiments, the superheat of the refrigerant is determined at liquid/vapor separator 118 using temperature and pressure measurements from temperature sensor 108 and pressure sensor 106, respectively. In various other embodiments, the superheat of the refrigerant can be determined at any location within refrigeration system 10 using temperature and/or pressure measurements of the refrigerant at that location.

Controller 154 may compare the amount of superheat to a setpoint range to determine whether the amount of superheat is within the setpoint range (e.g., below a minimum level threshold, above a maximum level threshold, outside a threshold range, etc.) (step 1014). If the amount of superheat is within the setpoint range, controller 154 may return to start 1002 without making any adjustments to expansion valve 70. However, if the amount of superheat is not within the setpoint range, controller 154 may determine whether the amount of superheat is above or below the setpoint range (step 1016). If the amount of superheat is above the setpoint range, controller 154 may operate expansion valve 70 to open more (i.e., move expansion valve 70 toward an open position) (step 1018). Opening expansion valve 70 more may allow more refrigerant to flow into evaporator 74, causing the amount of superheat to decrease toward the setpoint range. Conversely, if the amount of superheat is below the setpoint range, controller 154 may close expansion valve 70 more (i.e., move expansion valve 70 toward a closed position) (step 1020). Closing expansion valve 70 more may decrease the flow of refrigerant into evaporator 74, causing the amount of superheat to increase toward the setpoint range.

Control System and Controller

Figure 16:
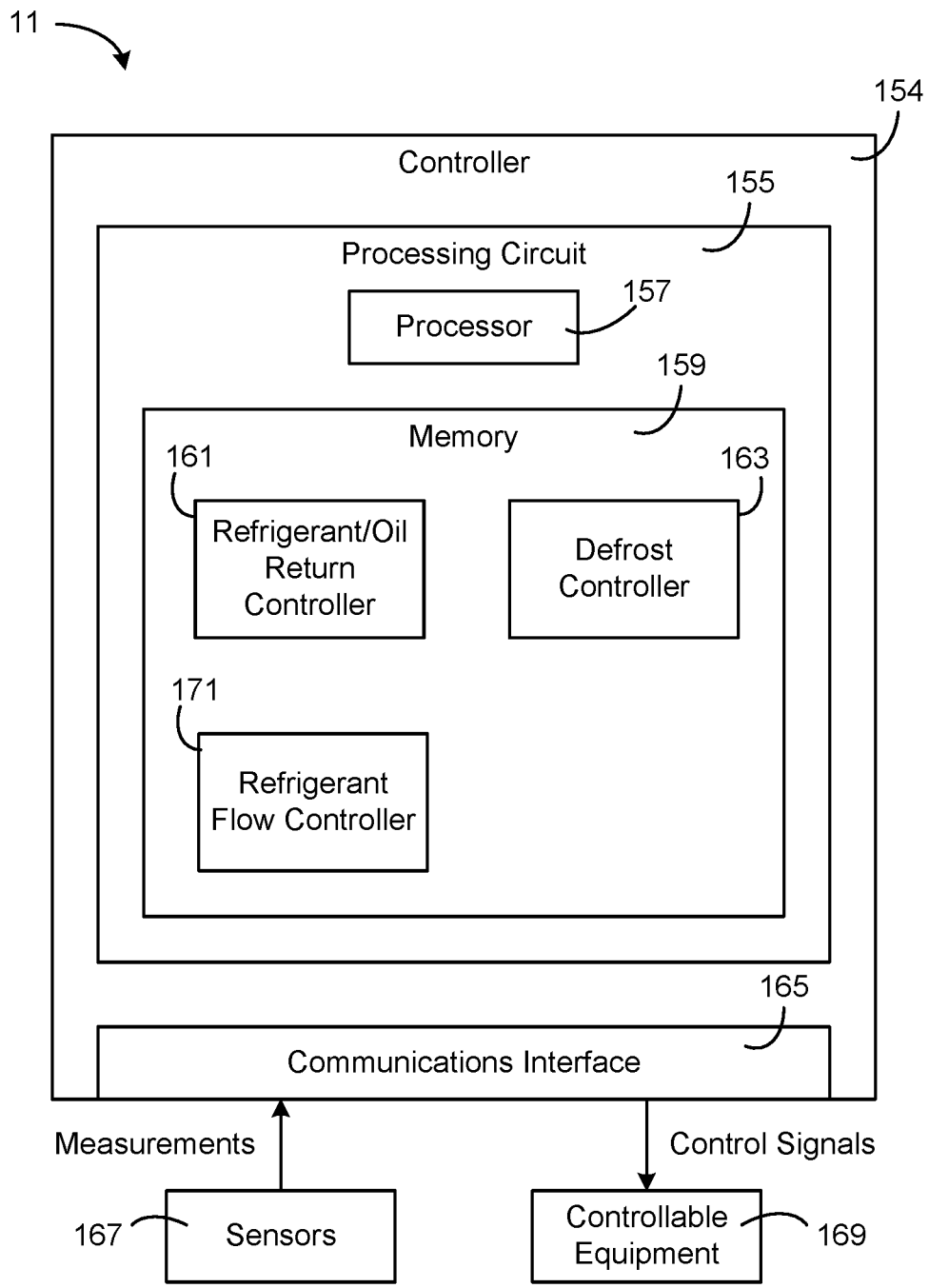
FIG. 16 is a block diagram illustrating the controller of the refrigeration system of FIG. 1A in greater detail, according to some embodiments.

Referring now to FIG. 16, a control system 11 is shown, according to an exemplary embodiment. Control system 11 can be used to monitor and control refrigeration system 10 and includes various components of refrigeration system 10 including controller 154, sensors 167, and controllable equipment 169. Controller 154 can be configured to receive measurements from sensors 167 (e.g., temperature, pressure, liquid level, flow rate, refrigerant quality, valve position, ice thickness, etc.) and provide control signals to controllable equipment 169 (e.g., valve position commands, pump on/off commands, activate/deactivate commands, etc.). Controller 154 can be configured to communicate with sensors 167 and controllable equipment 169 via communications interface 165.

Sensors 167 may include any of the sensors or measurement devices of refrigeration system 10 as described with reference to FIGS. 1-15 including, for example, discharge pressure sensor 16, discharge temperature sensor 18, oil level sensor 22, oil temperature sensor 24, oil temperature sensor 32, oil pressure sensor 34, economizer pressure sensor 62, economizer temperature sensor 64, liquid level sensor 76, temperature sensor 78, vapor quality sensor 80a, pressure sensor 80b, high level cutout sensor 86, suction temperature sensor 92, suction pressure sensor 94, liquid level sensor 98, pressure sensor 106, temperature sensor 108, liquid level sensor 112, oil level sensor 114, evaporator suction air temperature sensor 142, evaporator discharge air temperature sensor 144, temperature sensors 146-152, ice sensor 166, and/or any other sensors of refrigeration system 10. In some embodiments, sensors 167 include other types of devices capable of providing measurements or other data inputs to controller 154 (e.g., user devices, external data sources, weather services, etc.).

Controllable equipment 169 may include any of the equipment of refrigeration system 10 shown in FIGS. 1-6 and/or any other equipment that can be operated by controller 154 to execute processes 200-900. For example, controllable equipment 169 may include compressor 12, oil heater 26, mixing valve 30, oil cooler outlet valve 36, oil cooler inlet valve 38, modulating valve 40, condenser outlet valve 42, condenser inlet valve 44, economizer pressure regulating valve 60, expansion valve 70, high pressure distributor 72, suction flow modulation valve 88, demister 96, transfer valves 102-104, demister 122, oil return valve 126, pressure regulating valve 130, low pressure liquid return valve 138, low pressure distributor 140, low pressure liquid return check valve 158, oil return check valve 160, gas vent valve 162, electric defrost heater 164, liquid refrigerant pump 168, liquid ejector 170, discharge gas bypass valve 172, hot gas defrost return valve 178, liquid stop valve 180, expansion valve 182, stop valve 186, four-way valve 188, three-way valve 190, expansion valve 194, water control valve 196, or any other type of equipment that can be operated by controller 154.

Communications interface 165 may include wired or wireless interfaces (e.g., jacks, antennas, transmitters, receivers, transceivers, wire terminals, etc.) for conducting data communications with various systems, devices, or networks. For example, communications interface 165 may include an Ethernet card and port for sending and receiving data via an Ethernet-based communications network. In another example, communications interface 165 may include a Wi-Fi transceiver for communicating via a wireless communications network. Communications interface 165 may be configured to communicate via local area networks or wide area networks (e.g., the Internet, a building WAN, etc.) and may use a variety of communications protocols (e.g., TCP/IP, point-to-point, etc.). In some embodiments, controller 154 uses communications interface 165 to receive measurements from sensors 167 send control signals to controllable equipment 169.

In some embodiments, controller 154 includes a processing circuit 155 having a processor 157 and memory 159. Processor 157 may be a general purpose or specific purpose processor, an application specific integrated circuit (ASIC), one or more field programmable gate arrays (FPGAs), a group of processing components, or other suitable processing components. Processor 157 may be configured to execute computer code or instructions stored in memory 159 or received from other computer readable media (e.g., CDROM, network storage, a remote server, etc.). Memory 159 may include one or more devices (e.g., memory units, memory devices, storage devices, etc.) for storing data and/or computer code for completing and/or facilitating the various processes described in the present disclosure. Memory 159 may include random access memory (RAM), read-only memory (ROM), hard drive storage, temporary storage, non-volatile memory, flash memory, optical memory, or any other suitable memory for storing software objects and/or computer instructions. Memory 159 may include database components, object code components, script components, or any other type of information structure for supporting the various activities and information structures described in the present disclosure. Memory 159 may be communicably connected to processor 157 via processing circuit 155 and may include computer code for executing one or more processes described herein.

Controller 154 can be configured to receive and process the measurements from sensors 167 to generate the control signals for controllable equipment 169. For example, controller 154 is shown to include a refrigerant/oil return controller 161, a defrost controller 163, and a refrigerant flow controller 171. Refrigerant/oil return controller 161 can be configured to operate controllable equipment 169 of refrigeration system 10 to execute the various refrigerant/oil return processes 200-500 described with reference to FIGS. 1A-3 and 7-10. Defrost controller 163 can be configured to operate controllable equipment 169 of refrigeration system 10 to execute the various defrost processes 600-900 described with reference to FIGS. 4-6 and 11-14. refrigerant flow controller 171 can be configured to operate controllable equipment 169 of refrigeration system 10 (e.g., expansion valve 70) to control the flow of refrigerant to evaporator 74 as described with reference to FIG. 15.

Configuration of Exemplary Embodiments

The construction and arrangement of the temperature-controlled display device as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the terms "exemplary" and "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "first", "second", "primary," "secondary," "above," "below," "between," etc.) are merely used to describe the orientation of various elements in the FIGURES. It should be noted that the orientation of various elements may differ according to other exemplary embodiments, and that such variations are intended to be encompassed by the present disclosure.

The present disclosure contemplates methods, systems and program products on memory or other machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products or memory including machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the FIGURES may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A refrigeration system comprising:
   a compressor configured to circulate a refrigerant within the refrigeration system;
   an evaporator configured to transfer heat into the refrigerant within the evaporator to provide cooling for a temperature-controlled space;
   a liquid/vapor separator configured to separate the refrigerant into vapor refrigerant and liquid refrigerant, the liquid/vapor separator comprising:
      an inlet fluidly coupled to an outlet of the evaporator and configured to receive the refrigerant from the evaporator;
      a vapor refrigerant outlet fluidly coupled to the compressor and configured to discharge the vapor refrigerant to the compressor; and
      a liquid refrigerant outlet fluidly coupled to the evaporator and configured to return the liquid refrigerant to the evaporator;
   a liquid level sensor configured to measure a level of liquid accumulated within the liquid/vapor separator;
   an oil level sensor configured to measure a level of oil accumulated within the liquid/vapor separator;
   a controller configured to initiate a liquid refrigerant return process in response to at least one of i) the level of liquid accumulated within the liquid/vapor separator exceeding a threshold value or ii) a calculated value based on the level of liquid accumulated within the liquid/vapor separator exceeding the threshold value, the level of liquid comprising a total level of oil and the liquid refrigerant accumulated within the liquid/vapor separator, the controller configured to:
      determine a level of liquid refrigerant accumulated within the liquid/vapor separator by subtracting the level of oil from the total level of oil and liquid refrigerant; and
      initiate the liquid refrigerant return process in response to the level of liquid refrigerant accumulated within the liquid/vapor separator exceeding the threshold value.

2. The refrigeration system of claim 1, wherein the compressor is configured to compress the refrigerant to create a high pressure source within the refrigeration system; the refrigeration system further comprising:
   a pressurization line fluidly coupling the high pressure source to the liquid/vapor separator; and
   a pressure regulating valve located along the pressurization line and operable to fluidly connect the liquid/vapor separator to the high pressure source and disconnect the liquid/vapor separator from the high pressure source.

3. The refrigeration system of claim 2, wherein connecting the liquid/vapor separator to the high pressure source causes the liquid refrigerant within the liquid/vapor separator to exit the liquid/vapor separator via the liquid refrigerant outlet and return to the evaporator.

4. The refrigeration system of claim 1, further comprising one or more transfer valves fluidly coupled to the vapor refrigerant outlet of the liquid/vapor separator and adjustable between:
   an open position in which the vapor refrigerant is permitted to exit the liquid/vapor separator via the vapor refrigerant outlet; and
   a closed position in which the vapor refrigerant is prevented from exiting the liquid/vapor separator through the vapor refrigerant outlet.

5. The refrigeration system of claim 4, wherein the controller is configured to perform the liquid refrigerant return process by:
   closing the one or more transfer valves to prevent the vapor refrigerant from exiting the liquid/vapor separator through the vapor refrigerant outlet;
   connecting the liquid/vapor separator to a high pressure source to pressurize the vapor refrigerant and liquid refrigerant within the liquid/vapor separator; and
   opening a liquid refrigerant return valve fluidly coupled to the liquid refrigerant outlet of the liquid/vapor separator, causing the liquid refrigerant within the liquid/vapor separator to exit the liquid/vapor separator via the liquid refrigerant outlet and return to the evaporator.

6. The refrigeration system of claim 1, wherein:
   the refrigerant received from the evaporator comprises oil;

the liquid/vapor separator is configured to separate the refrigerant into the vapor refrigerant, the liquid refrigerant, and the oil; and the liquid/vapor separator comprises an oil outlet fluidly coupled to the compressor and configured to return the oil to the compressor.

7. The refrigeration system of claim 6, further comprising an oil return valve fluidly coupled to the oil outlet of the liquid/vapor separator and adjustable between:

an open position in which the oil is permitted to exit the liquid/vapor separator via the oil outlet; and a closed position in which the oil is prevented from exiting the liquid/vapor separator through the oil outlet.

8. The refrigeration system of claim 7, wherein the controller is configured to perform an oil return process comprising:

closing one or more transfer valves to prevent the vapor refrigerant from exiting the liquid/vapor separator through the vapor refrigerant outlet;

connecting the liquid/vapor separator to a high pressure source to pressurize the vapor refrigerant, the liquid refrigerant, and the oil within the liquid/vapor separator; and opening the oil return valve, causing the oil within the liquid/vapor separator to exit the liquid/vapor separator via the oil outlet and return to the compressor.

9. The refrigeration system of claim 1, comprising:

an expansion valve operable to modulate a flow of refrigerant into the evaporator; and wherein the controller is configured to operate the expansion valve to increase the flow of refrigerant into the evaporator or decrease the flow of refrigerant into the evaporator based on the level of liquid measured by the liquid level sensor.

10. The refrigeration system of claim 9, wherein the controller is configured to operate the expansion valve to increase the flow of refrigerant into the evaporator or decrease the flow of refrigerant into the evaporator based on the level of liquid refrigerant.

11. The refrigeration system of claim 9, wherein the controller is configured to compare the level of liquid accumulated within the liquid/vapor separator to the threshold value;

modulate the expansion valve toward a fully open position to increase a flow of refrigerant into the evaporator in response to the level of liquid accumulated within the liquid/vapor separator that is less than the threshold value; and modulate the expansion valve toward a fully closed position to decrease the flow of refrigerant into the evaporator in response to the level of liquid accumulated within the liquid/vapor separator that is greater than the threshold value.

12. The refrigeration system of claim 1, comprising a trap located between the evaporator and the liquid/vapor separator, the trap being configured to collect liquid refrigerant and direct the liquid refrigerant into a lower portion of the liquid/vapor separator.

13. The refrigeration system of claim 1, comprising a low pressure liquid return line fluidly coupling a lower portion of the liquid/vapor separator to the evaporator, the low pressure liquid return line being configured to deliver a low pressure liquid refrigerant from the liquid/vapor separator to the evaporator via a low pressure distributor.

14. The refrigeration system of claim 1, comprising a demister positioned within the liquid/vapor separator, the demister being configured to separate liquid refrigerant and oil from the vapor refrigerant.

15. A method comprising:

measuring a level of liquid accumulated within a liquid/vapor separator;

measuring a level of oil accumulated within the liquid/vapor separator;

determining that at least one of i) the level of liquid accumulated within the liquid/vapor separator exceeds a threshold value or ii) a calculated value based on the level of liquid accumulated within the liquid/vapor separator exceeds the threshold value, the level of liquid comprising a total level of oil and liquid refrigerant accumulated within the liquid/vapor separator;

in response to said determination, determining a level of liquid refrigerant accumulated within the liquid/vapor separator by subtracting the level of oil from the total level of oil and liquid refrigerant; and initiating a liquid refrigerant return process in response to the level of liquid refrigerant accumulated within the liquid/vapor separator exceeding the threshold value.

16. The method of claim 15, further comprising:

closing one or more transfer valves to prevent vapor refrigerant within the liquid/vapor separator from exiting the liquid/vapor separator through a vapor refrigerant outlet of the liquid/vapor separator;

connecting the liquid/vapor separator to a high pressure source to pressurize the vapor refrigerant and the liquid refrigerant within the liquid/vapor separator; and opening a liquid refrigerant return valve fluidly coupled to a liquid refrigerant outlet of the liquid/vapor separator, causing the liquid refrigerant within the liquid/vapor separator to exit the liquid/vapor separator via the liquid refrigerant outlet and return to an evaporator.

17. The method of claim 16, further comprising opening an oil return valve fluidly coupled to an oil outlet of the liquid/vapor separator, causing oil within the liquid/vapor separator to exit the liquid/vapor separator via the oil outlet and return to a compressor.

18. The method of claim 16, further comprising:

determining a level of the liquid refrigerant accumulated within the liquid/vapor separator and;

closing the one or more transfer valves, connecting the liquid/vapor separator to the high pressure source; and opening the liquid refrigerant return valve in response to a determination that the level of the liquid refrigerant accumulated within the liquid/vapor separator violates a threshold condition.

19. The method of claim 15 further comprising:

comparing the level of liquid accumulated within the liquid/vapor separator to the threshold value; and based on a result of the comparison, operating an expansion valve to increase a flow of refrigerant into an evaporator or decrease the flow of refrigerant into the evaporator based on the level of liquid refrigerant.

20. The method of claim 19, wherein operating the expansion valve to increase the flow of refrigerant into the evaporator or decrease the flow of refrigerant into the evaporator based on the level of liquid refrigerant comprises modulating the expansion valve toward a fully closed position to decrease the flow of refrigerant into the evaporator in response to the level of liquid accumulated within the liquid/vapor separator that is greater than the threshold value.

* * * * *